(12) United States Patent
Baron

(10) Patent No.: US 11,970,967 B1
(45) Date of Patent: Apr. 30, 2024

(54) ROTARY ENGINE

(71) Applicant: Richard Baron, St. Paul, MN (US)

(72) Inventor: Richard Baron, St. Paul, MN (US)

( * ) Notice: Subject to any disclaimer, the term of this patent is extended or adjusted under 35 U.S.C. 154(b) by 0 days.

(21) Appl. No.: 18/308,944

(22) Filed: Apr. 28, 2023

Related U.S. Application Data

(63) Continuation of application No. 17/716,236, filed on Apr. 8, 2022, now Pat. No. 11,680,520, which is a continuation of application No. 16/868,026, filed on May 6, 2020, now Pat. No. 11,319,872.

(51) Int. Cl.
| | | |
|---|---|---|
| *F01C 1/22* | (2006.01) |
| *F02B 53/00* | (2006.01) |
| *F02B 53/02* | (2006.01) |
| *F02B 53/10* | (2006.01) |

(52) U.S. Cl.
CPC ............... *F02B 53/10* (2013.01); *F01C 1/22* (2013.01); *F02B 53/02* (2013.01); *F02B 2053/005* (2013.01)

(58) Field of Classification Search
CPC .... F02B 2053/005; F02B 53/10; F02B 53/02; F01C 1/22
USPC ............ 123/241, 245; 418/34–36, 61; 60/39
See application file for complete search history.

(56) References Cited

U.S. PATENT DOCUMENTS

| | | | | |
|---|---|---|---|---|
| 2,318,990 A | * | 5/1943 | Doran | .................. F04D 17/127 415/64 |
| 2,320,391 A | * | 6/1943 | Wakefield | ................. F02C 5/12 60/39.38 |
| 2,615,616 A | * | 10/1952 | William | .................. F04D 17/02 415/83 |
| 2,988,008 A | | 6/1961 | Wankel | |
| 3,726,619 A | * | 4/1973 | Adams | ...................... F01D 1/28 415/60 |
| 5,154,149 A | * | 10/1992 | Turner | .................... F02B 53/00 418/206.5 |
| 5,284,427 A | * | 2/1994 | Wacker | ................... F01C 21/06 418/83 |
| 5,404,850 A | * | 4/1995 | La Bell, Jr. | .......... F01C 11/004 123/263 |
| 6,432,855 B1 | | 8/2002 | Cook et al. | |

(Continued)

OTHER PUBLICATIONS

Ames Laboratory, "Tough Nanocoatings Boost Industrial Energy Efficiency", News Release—Ames National Laboratory, 2 pgs. (Nov. 18, 2008).

(Continued)

*Primary Examiner* — J. Todd Newton
(74) *Attorney, Agent, or Firm* — Dicke, Billig & Czaja, PLLC

(57) ABSTRACT

A rotary engine comprised of a pair of counterrotating rotors within a non-rotating outer housing. Each of the rotors is coupled to a common power shaft, one directly and the other through a reversing gear arrangement. Both are driven by the hyper-expansion of combustion gases in a repeating combustion cycle. Each has a generally circular, nearly frictionless working surface perpendicular to the power shaft axis. Each rotor surface defines chambers which rotate past each other. Within such chambers, compressed air and fuel are introduced, mixed, ignited, allowed to hyper-expand (and thus cause the rotation) and exhausted. The power shaft may be connected to a conventional clutch, torque converter, gearbox, differential, alternator or a similar system.

38 Claims, 28 Drawing Sheets

(56) References Cited

U.S. PATENT DOCUMENTS

| | | | | |
|---|---|---|---|---|
| 6,575,391 | B1 * | 6/2003 | Brown, Jr. | ............ B02C 13/30 |
| | | | | 241/259 |
| 8,056,527 | B2 | 11/2011 | De Oliveira | |
| 8,365,898 | B2 | 2/2013 | Horst | |
| 9,169,872 | B2 | 10/2015 | Sears et al. | |
| 11,319,872 | B1 * | 5/2022 | Baron | ................ F01C 1/22 |
| 11,680,520 | B1 * | 6/2023 | Baron | ................ F01C 1/26 |
| | | | | 418/61.2 |
| 2009/0066115 | A1 * | 3/2009 | Browne | ............ B62D 29/00 |
| | | | | 296/187.03 |
| 2018/0290770 | A1 * | 10/2018 | Opalek | ............ B64C 39/001 |

OTHER PUBLICATIONS

Kleiner, "Material slicker than Teflon discovered by accident", New Scientist: Technology, 3 pgs. (Nov. 21, 2008).

\* cited by examiner

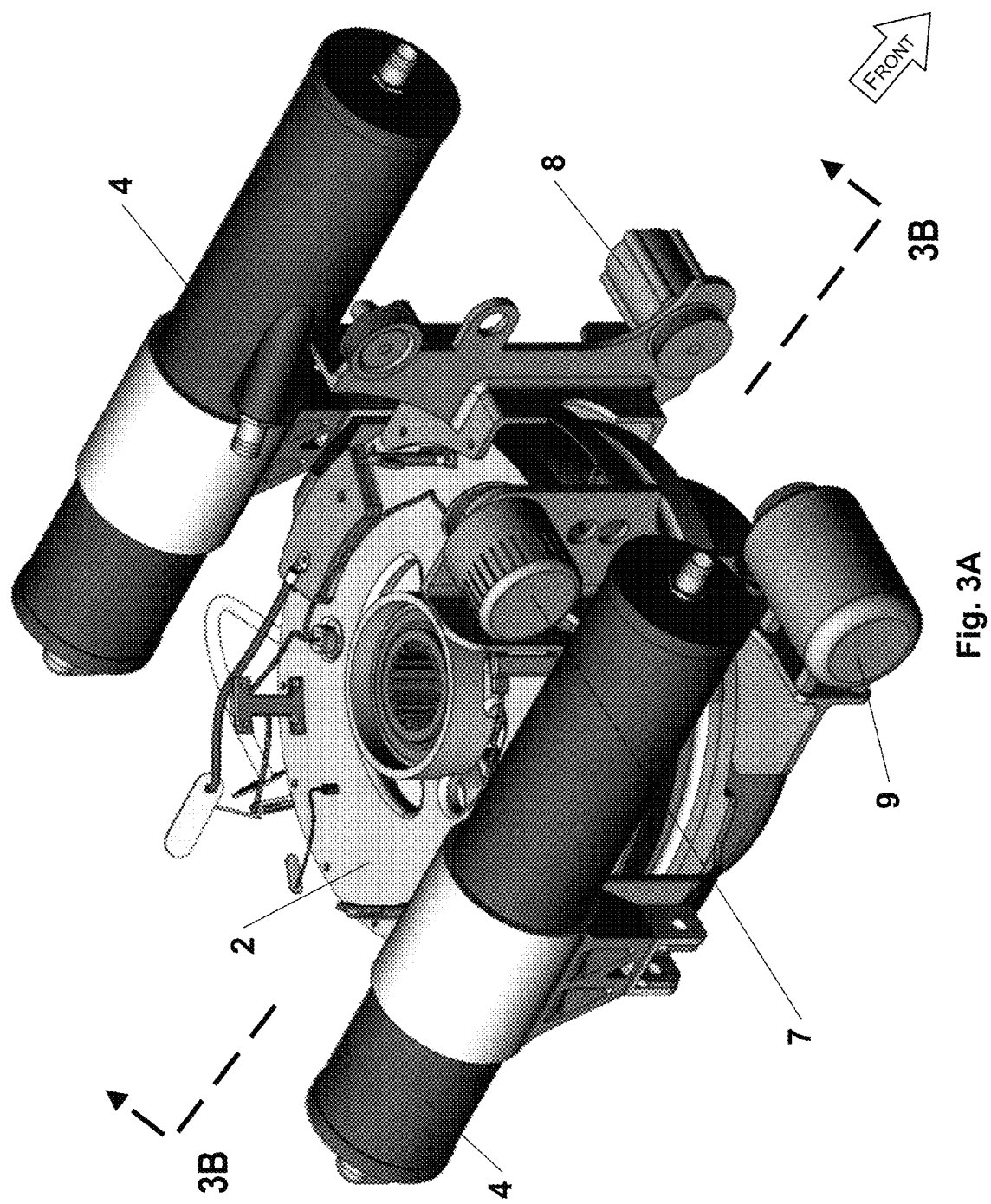

1 COMPRESSION

2 COMPRESSED AIR INTO HEMI-COMBUSTION CHAMBERS

3 HEMI-COMBUSTION CHAMBERS SEALED

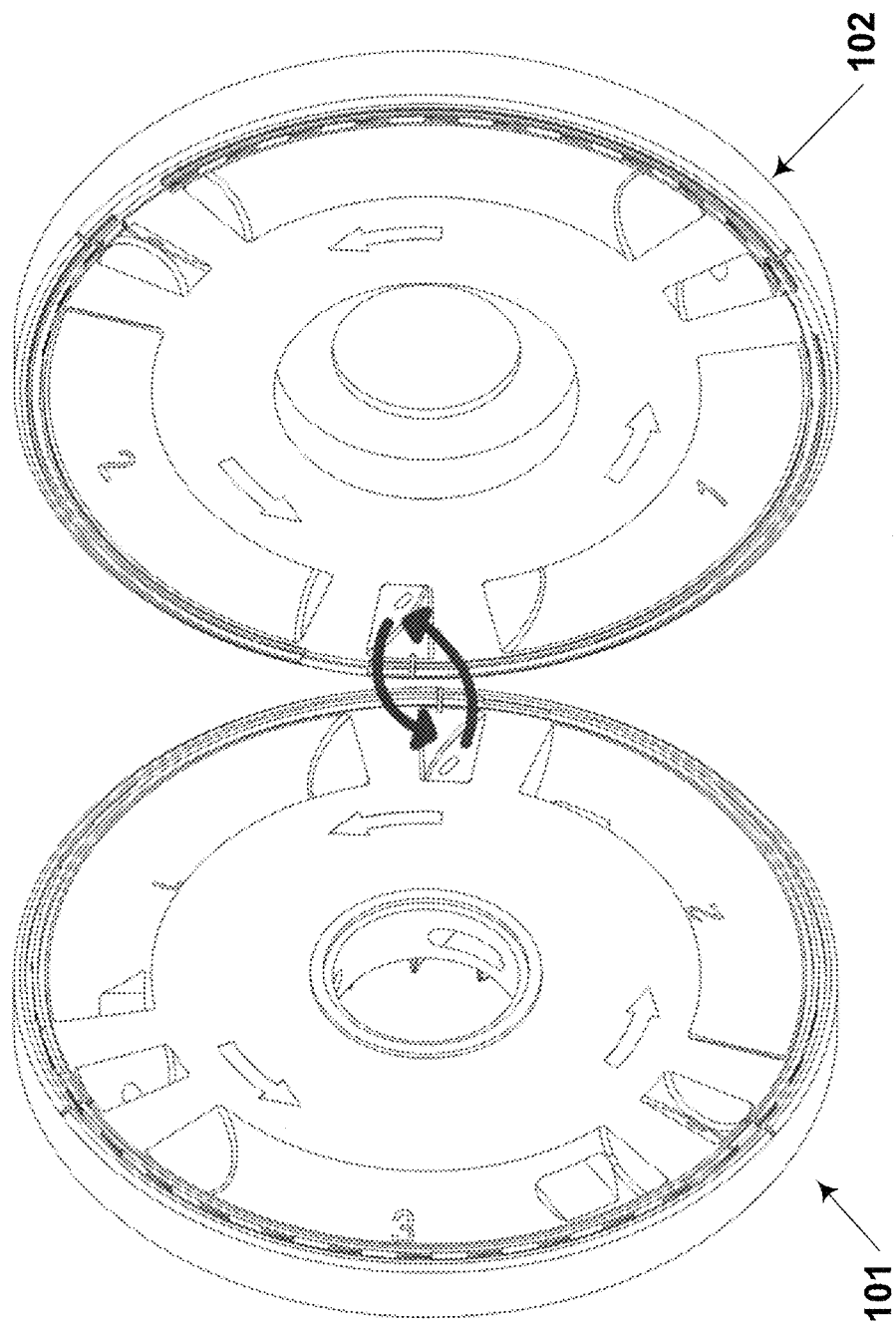

5 FUEL INJECTION

7 COMBUSTION

8 POWER - EXPANSION

9 POWER - HYPEREXPANSION

ROTARY ENGINE

TECHNICAL FIELD

This invention relates to fuel-burning engines of the type in which rotors, instead of reciprocating pistons, are driven by combustion of the fuel within a confined volume. Volume expansion of the combusted fuel produces forces which drive the rotation of the rotors and thus of a power shaft coupled to the rotors.

This disclosure relates generally to internal combustion engines and specifically to a dual-rotor, counter-rotating rotary engine.

BACKGROUND

Many variations of the internal combustion engine have been patented in the past. The primary operational engines have been of either the reciprocating piston variety or the rotary variety. Many improvements on the reciprocating piston engine have been made over the past century; but the primary problem of inefficiency has been only marginally improved over the past 10-15 years with fuel injection, double overhead cams, multiple valves per cylinder, variable valve timing, variable ignition timing, turbocharging etc. Nonetheless, the reciprocating piston engine remains very inefficient because of the following issues: 1) Very large surface area of the combustion chamber that rapidly cools the combustion gases; 2) Slow combustion gas pressure rise because the air-fuel charge can only be ignited in the head and not over the piston; 3) Reciprocal power must be converted to rotary power; 4) Inability to capture the last 50% of the expansion power of the combustion gases because the power stroke is the same length as the compression stroke; 5) High energy loss due to friction of the rings moving up and down four times on the cylinder wall for each power stroke (four cycle engine); and 6) The engine must also serve as a air compressor, which reduces the number of possible power strokes per revolution.

The first commercially successful rotary engine was patented in Germany by Felix Wankel and associates in the 1950's. Both Mazda and General Motors developed their version of the Wankel engine, Mazda to use in the automobile and General Motors to use in recreational vehicles such as snowmobiles and boats. Both of these companies have ceased production of the rotary engine because of numerous problems with seals, pollution, reliability and efficiency. Nonetheless, the potential for the rotary engine to be lightweight and efficient has prompted many more patents for versions of the rotary engine. The rotary engine may be the ideal engine to generate power for the new electric vehicles.

Some of the more successful and recent rotary engines include Wankel, Freedom, Liquid Piston and Split-Chamber rotary. Although the embodiments disclosed here are entirely unrelated to these rotary engines, it is worth reviewing them to see how they differ from the disclosed embodiments.

The Wankel engine has been the single most successful rotary engine, although none are presently in production. The Wankel was produced by Mazda for automobile use and by General Motors Corp. for use in recreational vehicles such as snowmobiles and boats. The Wankel engine consists of a triangular, eccentric rotor with slightly curved sides and an epitrochoid-shaped housing. The rotor surfaces each complete one Otto cycle per revolution, with each face having one intake, compression, power and exhaust stroke. Thus, the rotor produces three power strokes per revolution; but, because of the eccentric gear drive to the power shaft, one revolution of the rotor causes the power shaft to rotate three revolutions. Therefore, the power shaft has one power stroke per revolution. As will be seen below, embodiments disclosed here have nine power strokes per revolution.

The Wankel has apex seals that ride over the outer housing to seal the compression and combustion in each face of the rotor. Because of the friction on the housing, the seals need to be lubricated by a sprayed mist of oil. This oil burns in the combustion chambers causing an increase in hydrocarbon pollution. While the seals move over the ovoid housing, they are forced to expand and contract and this then causes the seals to lose their seat on the housing and float off the surface causing leakage of the gases and inefficiency. As will be seen below, embodiments disclosed here have virtual seals which do not need lubrication. The surface area of the combustion chamber in the embodiments disclosed below is smaller than the stator surface area in most rotary engines. The piston excursion of the embodiments disclosed below is less than in most rotary engines. The combustion chamber of the embodiments disclosed below is preferably coated with a material such as BAM to insulate heat loss.

Cooling of the large combustion surface area in the stator is a problem with many rotary engines. Since the heat is generated during the power stroke and not during the intake and exhaust strokes, the housing is unevenly heated and the cooling must be significant enough to cool the hottest parts of the housing. In doing so, the cooler parts of the housing are also cooled further and this extracts more heat from the combustion event and decreases efficiency. The embodiments disclosed below have a small combustion chamber and a small piston excursion after combustion and the combustion chamber is preferably coated with a material such as BAM. These will reduce the heat loss and increase efficiency. Because the combustion heating is distributed evenly over the perimeter of the rotors, there will be minimal differential heating and cooling.

After these problems with the Wankel engine became well known, a number of new arts attempted to solve these problems. Among these are the Freedom Motors (formerly General Motors Corporation U.S. Pat. No. 2,988,008) and the Split-chamber rotary engine (U.S. Pat. No. 8,056,527). When production of the GMC version of the Wankel was discontinued, GMC sold their entire engine development to Freedom Motors. Freedom Motors has since done the following things to improve the function of the GMC Wankel: 1) Patented intake and porting improvements that they say increase power by 50%, 2) Developed a method to insulate the rotor bearing from the rotor, 3) Patented a new tip seal and a rotor housing coating, 4) Developed tuned intake and exhaust systems, 5) Patented a lubrication system that eliminates oil mixing and spraying oil into the intake air. This company has also demonstrated its lightweight and high power-to-weight engines in vehicles from motor scooters and automobiles to their Skycar (a flying car) and an aerial vehicle for rescuing people from burning high-rise buildings. The embodiments disclosed below will also have a high power-to-weight ratio.

The Split-Chamber rotary engine demonstrates a new method to separate the Otto cycle function of air compression from combustion and expansion and, in so doing, increases the efficiency of the rotary engine. The engine consists of a circular rotor in a housing with combustion chambers formed peripherally around the rotor. The rotor is subdivided into combustion chambers by rotor vanes. Installed peripherally to the rotor housing are compression modules that are attached to the housing. In the compression modules the air is compressed by reciprocating pistons that are driven by combustion gas that is transferred through valves from the combustion chambers. This does separate the compression function from the power function of the engine. The embodiments disclosed below also separate the compression and power functions of the engine, but in a totally different fashion.

One rotary engine type stands out as unique, namely, the Liquid Piston engine (U.S. Pat. No. 8,365,698). While the engine, at first glance, appears similar to the Wankel engine, the inventor explains that it has an entirely new high efficiency hybrid cycle that combines the best of the Otto, Diesel, Rankine and Atkinson cycles. The rotor is essentially oval and the housing is essentially triangular and in the central core of each triangular housing are small, recessed combustion cavities. When the rotor moves past the combustion area, the volume remains essentially constant for about 20 degrees of rotation. This allows the fuel to be injected and ignited and allows the pressure and temperature to rise before the rotor is driven. This increases the efficiency of the engine. The rotor runs in the triangular housing path and connects to the power shaft in a similar manner to the Wankel. The engine has demonstrated use with spark ignited and compression ignited fuels. The engine also has the ability to hyper-expand the power stroke. The inventor claims a theoretical efficiency of 75%, which is far greater than any existing piston or rotary engine.

Similar to the embodiments disclosed below, the Liquid Piston engine has the following advantages: 1) Simplicity and light weight, 2) High power-to-weight ratio, 3) Ability to hyper-expand the combustion gases to capture all of the expansion energy and 4) Efficient, quiet and vibration-free operation. In addition to these advantages, embodiments disclosed below have the following advantages: 1) Separation of air compression from power stroke to allow rapid repetition of power and exhaust strokes, 2) Ability to ignite fuel from two sides, 3) Ability to use spark-controlled compression ignition and 4) Nine power strokes per revolution.

SUMMARY

In general terms, a rotary engine comprises two counter-rotating rotors of which one is directly coupled to and, therefore, rotates in the same direction as the power shaft (i.e., clockwise viewed from above); and the other (which rotates in the opposite direction or counter-clockwise) is coupled to the power shaft through a reversing gear arrangement. Both rotors are driven by hyper-expansion of combustion gases in a repeating combustion cycle. Each rotor has a generally circular working surface lying in a plane perpendicular to the common axis of rotation (i.e., the axis of symmetry of the power shaft). The two working surfaces face each other and are separated by a gap, preferably a two-millimeter gap, although other distances are possible in alternative embodiments provided the two working surfaces do not touch each other. They are preferably coated with BAM, which is an alloy that is heat resistant, insulating and has a very low coefficient of friction. The topology of each rotor surface (i.e., the shape, height and depth of the surface in a particular location or region of the rotor) creates chambers within the rotor. Within such chambers air and fuel are introduced, mixed, ignited, allowed to hyper-expand (and thus drive the rotors) and exhausted. The power shaft (as driven by the rotors) may be connected to a conventional clutch, torque converter, gearbox, differential, alternator or similar power transfer system.

The rotary engine consists of dual, counter-rotating rotors with compression cylinders and combustion chambers arrayed around the outer, inner margins of the rotor discs. In the large version of the art, air enters the engine through the power shaft after compression by a supercharger. When a supercharger is employed, it feeds air through membrane oxygen concentrators to raise the oxygen concentration and lower the nitrogen concentration of the ambient air, thus, increasing the efficiency of fuel combustion and decreasing the energy wasted heating inert nitrogen and then sending this energy out the exhaust. The air entering the power shaft is monitored for oxygen concentration, temperature and pressure. The airflow into the power shaft is controlled by an iris valve controlled by the engine control module. In an alternative embodiment (the "small" version discussed below), air enters both ends of the power shaft at atmospheric pressure.

Once air enters the power shaft, it is spun to the rpm of the engine and flows down the power shaft to the air intake ports in the primary rotor. When the engine is running, it spins the air down the air intake tubes to the compression cylinders. In so doing, it creates negative pressure in the air intake tubes and this then continues to pull air in from the power shaft. Once in the power shaft, the air intake tube and the compression chamber, the air is further compressed by centrifugal force and then by ram compression before it is driven into the hemi combustion chambers which then merge into the full combustion chambers. Air enters the combustion chamber while spinning in a vortex. The fuel is then injected into the center of the vortex and this immediately results in a thinner outer and a denser inner concentration of fuel and air mixture. This mixture is then ignited by two spark plugs (one in each rotor). The ignition of the outer layer of mixture causes a rapid rise in temperature and pressure that then causes the inner, denser mixture to instantaneously ignite by compression ignition resulting in a very rapid pressure rise that drives the pistons before they have a chance to move away from the expanding gases. This results in increased efficiency.

The pistons on the opposing rotors are driven apart in opposite directions. The combustion chambers and the compression cylinders are preferably coated with BAM (boron, aluminum, magnesium alloy) to decrease energy loss. The combustion gases are allowed to expand to approximately two times the width of the combustion chamber to use all of the expanding combustion gas pressure. Once the gas expansion is complete, the gases are expelled through exhaust ports by a combination of centrifugal force, Venturi effect and compressed air. The reversed power of the secondary rotor is reversed by a gearbox to turn the power shaft in the same direction as the primary rotor.

The air in the compression cylinders and the combustion gas in the combustion chambers are contained in their respective places by a virtual seal around the periphery of the rotors. This seal is composed of tongues and grooves with two millimeter (preferably) spacing between them. In order to escape to the external air pressure along the outer perimeter of the rotors, the gases must make a number of turns, preferably eight 90-degree turns. The passage of gas through the grooves may be slowed by concave reflectors at the end of each straight passage and by turbulence blocks that line the passages and create mini vortices in the passages. The gases cannot escape centrally because the primary rotor and the bearing on the secondary rotor are pressed on the power shaft and there is no gap to move through. They can move in the direction of the moving rotors and pistons but will be obstructed by the following facts: 1)

The rotors are moving at a very high speed, i.e., 2,000 rpm, away from the escaping gas; 2) The gap between the rotors is very small (preferably two millimeters) and the escape time is one-half the time of a piston engine because there are two pistons being driven by the same charge; 3) The gas escapes in a straight line (Newton's First Law) and the rotor moves in a circular path causing the escaping gas to hit the outer wall of the rotor and then be reflected back into the combustion chamber; 4) The outer margin of the combustion chamber is very short, in the preferred embodiment only 4 inches, compared to a comparable piston engine ring seal of 12 inches (a four inch bore and a four inch stroke require a 12 inch seal); and 5) The combustion gas is escaping into the compression cylinder which has a pressure in the preferred embodiment of about 10 atmospheres, therefore slowing the escaping gas.

Since there is complete expansion of the combustion gases to atmospheric pressure, there is no expansion outside of the engine and, thus, minimal exhaust sound. There should be no need for a muffler on this engine. Also, since the blowby gases (i.e., incompletely combusted fuel) are thrown by centrifugal force into the "ring of fire" around the outer margin of the rotors, there is no need for a catalytic converter.

To calculate the amount of combustion gas that can escape to atmospheric pressure with each power stroke, while possible, would require very complex derivative functions since the pressure in the combustion chamber rises very rapidly and then decreases continually and the potential escape time is very limited at each power level. The total potential escape time at 2,000 rpm (cruise) with a twenty-two inch circumference at the combustion chamber and a four-inch length of the virtual seal would be 0.033 second. Referring briefly to FIG. 3D, since the escaping gas would have to navigate through passage 125, past a concave reflector 123, around four turbulence blocks 124 and past other reflectors and turbulence blocks throughout the passage and start and stop eight times to make all the turns created by the tongues 121 and grooves 122 in the virtual seal 120, it is unlikely that any significant amount of gas could escape before the pistons move and consume all the expansion pressure of the gas. Also, the gas has only a (preferably) two-millimeter gap (the nominal "height" of passage 125 measured between the primary rotor 101 and the secondary rotor 102) to move through, severely limiting the amount of gas that can flow in this limited time.

The engine does not run in oil (no surface tension) and has no friction parts other than the bearings and gears which are all sealed and run in synthetic lubricant. There are no rings or rotor seals rubbing on the block or casing. There are no mechanical internal parts such as wrist pins, rods, cam shafts, valves etc. The fuel and exhaust gases move through ports that open through the virtual seal. Because the rotors are inherently balanced in counter-rotation and because there are nine power strokes per revolution, the engine will be very stable and smooth running.

When the exhaust has been expelled, the combustion chambers again divide into hemi combustion chambers. The hemi combustion chambers that advance toward each other form the next series of combustion chambers and the process begins again. This allows for multiple power strokes per revolution. Because the compression range is quite large, any hydrocarbon fuel can be used if the compression and combustion chamber temperature are allowed to reach the proper level for ignition and combustion.

The power produced by the engine may be determined by the size of the rotors and combustion chambers, the number of combustion chambers per rotor, the number of rotors that are connected in series and whether the engine utilizes the ability to have a supercharger and oxygen concentrator. Therefore, the engine should have a wide range of applications from automobiles to small equipment like blowers and chainsaws. Because of the simplicity of the engine, it should be less expensive to build and maintain than any present piston or rotary engine. Because of the following aspects, the engine should be extremely efficient: 1) Rotary, no conversion of reciprocal to rotary power, a 18% energy saving; 2) No piston rings moving up and down a cylinder wall four times for each power stroke, a 20% energy saving; 3) No friction parts, unknown saving; 4) The engine does not run in oil, unknown saving; 5) The engine has oxygen concentration of $O_2$ to $N_2$ of 1:1 instead of 1:4 with ambient air, energy saving of at least 25% because much less energy is expended heating inert nitrogen and then throwing the hot gas out the exhaust; 6) More complete combustion with higher oxygen concentration; 7) Three power strokes per revolution for each of three combustion chambers resulting in nine power strokes per revolution; 8) New spark-controlled compression ignition causing very rapid pressure and temperature rise and increased efficiency because the pistons have no chance to move away before the combustion gases have a chance to push them; 9) 100% hyper-expansion of the power stroke to capture the residual expansion energy that a piston engine throws out the exhaust; 10) Supercharged for maximum compression and efficiency (large engine only); and 11) Intake and compression strokes operate continually outside of combustion chamber allowing for rapid repetition of power and exhaust strokes.

DESCRIPTION OF THE DRAWINGS

The figures are schematic and provided for illustration only; and, thus, do not limit the scope of the claims. In particular, common accessories and components, such as mounting hardware, electrical wiring, exhaust piping, cooling fluid piping etc. have been omitted from the figures or descriptions solely for clarity. See Tables 1-4 for references.

FIG. 3A is a perspective view of another portion of the rotary engine of FIGS. 1A-1E. Some components have been removed for purposes of illustration.

FIG. 5A is shaded and FIG. 5B is not. See Table 4 for reference letters.

FIGS. 6A-6K schematically illustrate the positions of the rotors of FIGS. 5A and 5B relative to each other during one cycle of an exemplary operating sequence.

DETAILED DESCRIPTION

Context

For purposes of illustration only, the rotary engine disclosed below is placed in the context of a vehicle such as an automobile, truck, boat or airplane. This is only a preference, as various embodiments are suitable for any application where an internal combustion engine is now employed.

Reference Directions and Nomenclature

In the description below, unless it is specifically stated (or dictated by context) to the contrary, the forward "longitudinal" direction is the direction of travel of a vehicle in which an engine is mounted. Thus, for purposes of illustration and reference only, the engine is described so that the "front" of the engine is the location of the ambient air intake scoop, as generally indicated by the arrow labeled "Front" which appears in many of the figures. In other words, "longitudinal" corresponds to "forward" or "reverse" directions of the vehicle and, thus, "transverse" refers to "left" or "right" consistent with the normal descriptions of the two sides of the vehicle. Similarly, "upward" and "downward" respectively refer to away from and toward the earth's center under normal conditions. The transverse direction is perpendicular to the longitudinal direction but within the horizontal plane of the location being considered. The vertical direction is perpendicular to the horizontal plane. Unless otherwise clear from context, clockwise and counterclockwise rotation have their ordinary meaning with respect to rotation about the vertical axis from the perspective of looking downward at the top of the engine; i.e., 12 o'clock is straight forward, toward the front of the vehicle and engine. In other applications, conventional corresponding directions would be understood; e.g., in maritime applications, fore and aft replace forward and rearward; port and starboard replace left and right.

General Engine Architecture

Figure 1A:
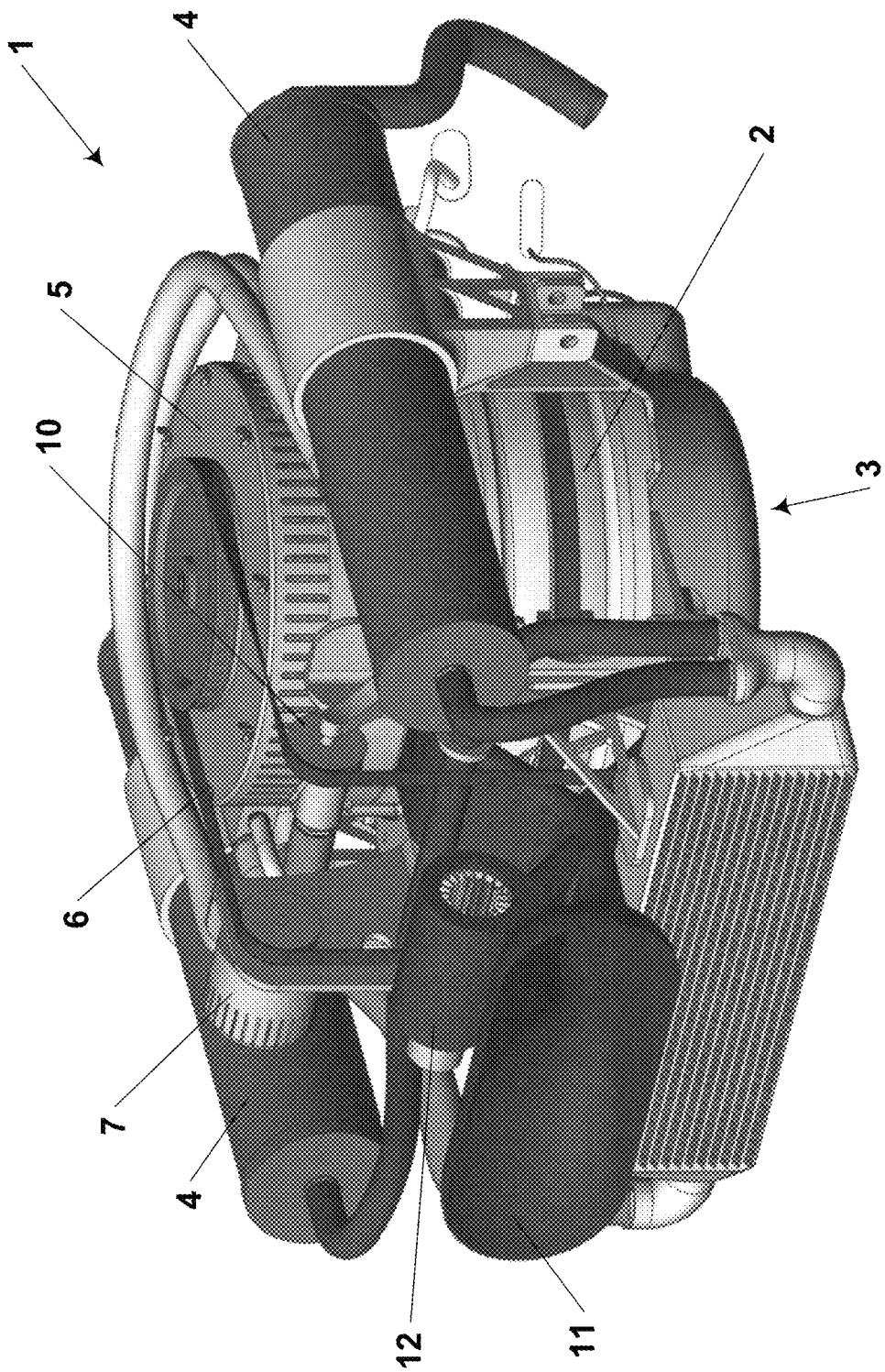
FIGS. 1A-1E include various views of one embodiment of an assembled rotary engine built according to the principles of one embodiment.
Figure 1B:
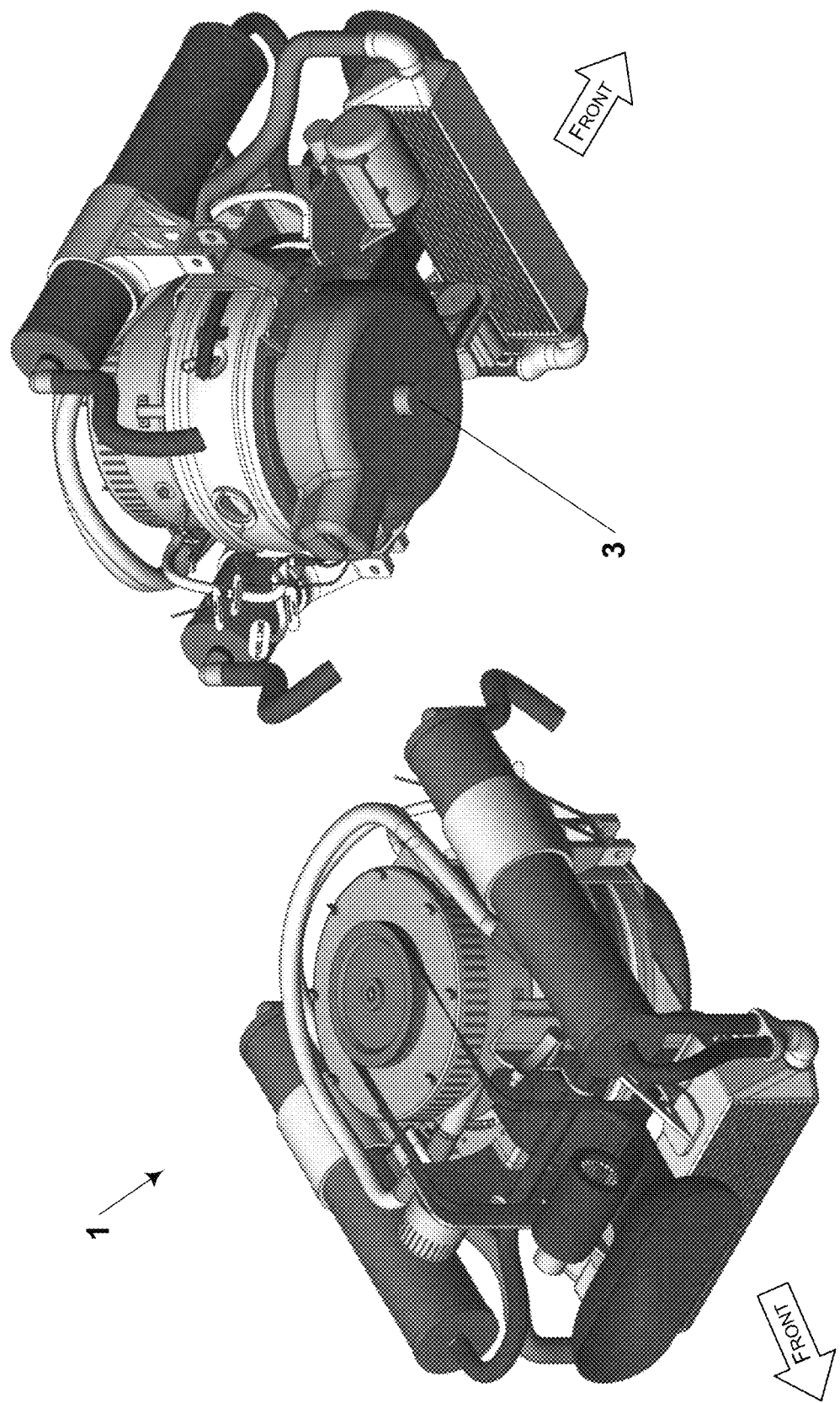
Figure 1C:
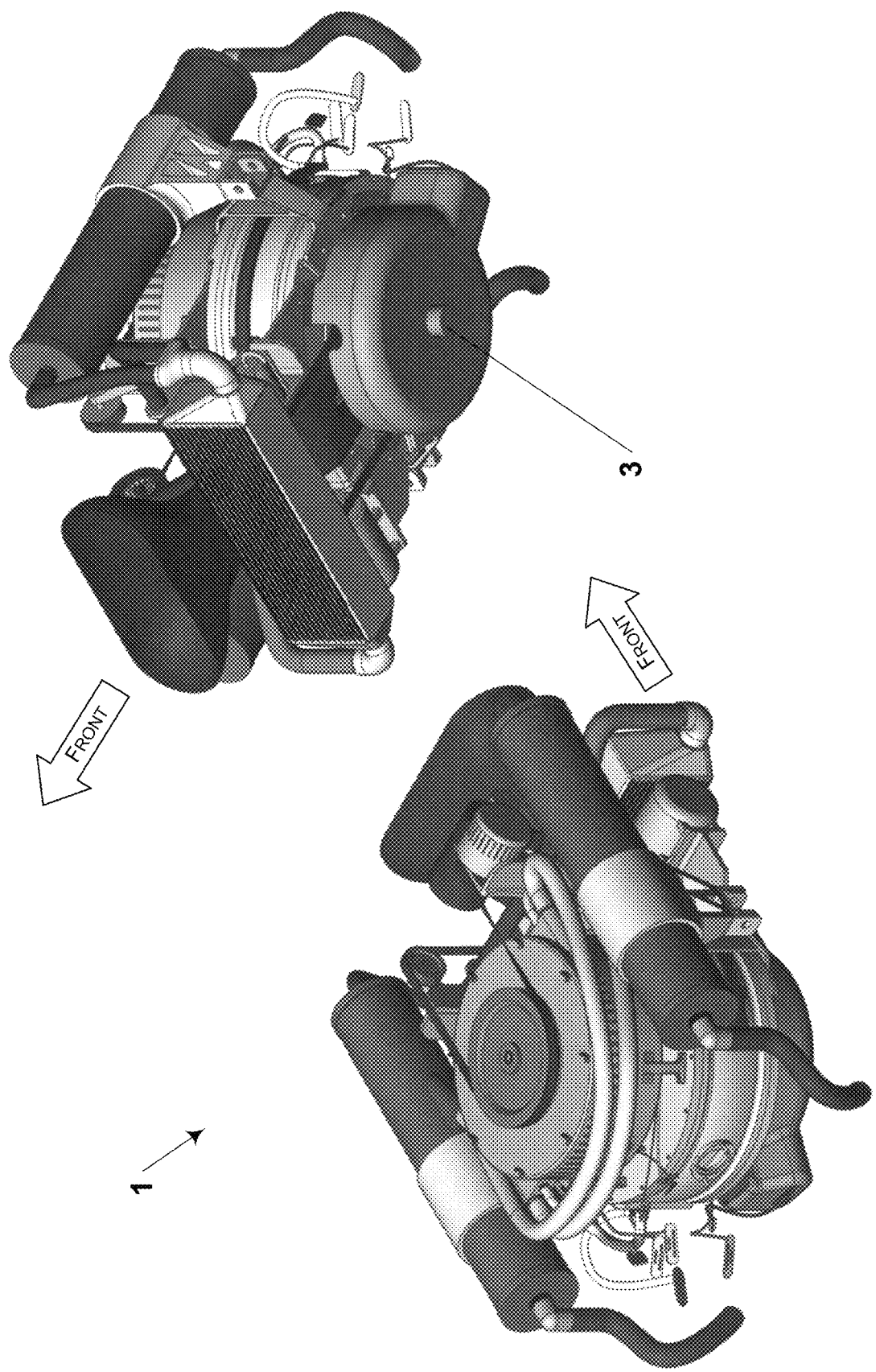
Figure 1D:
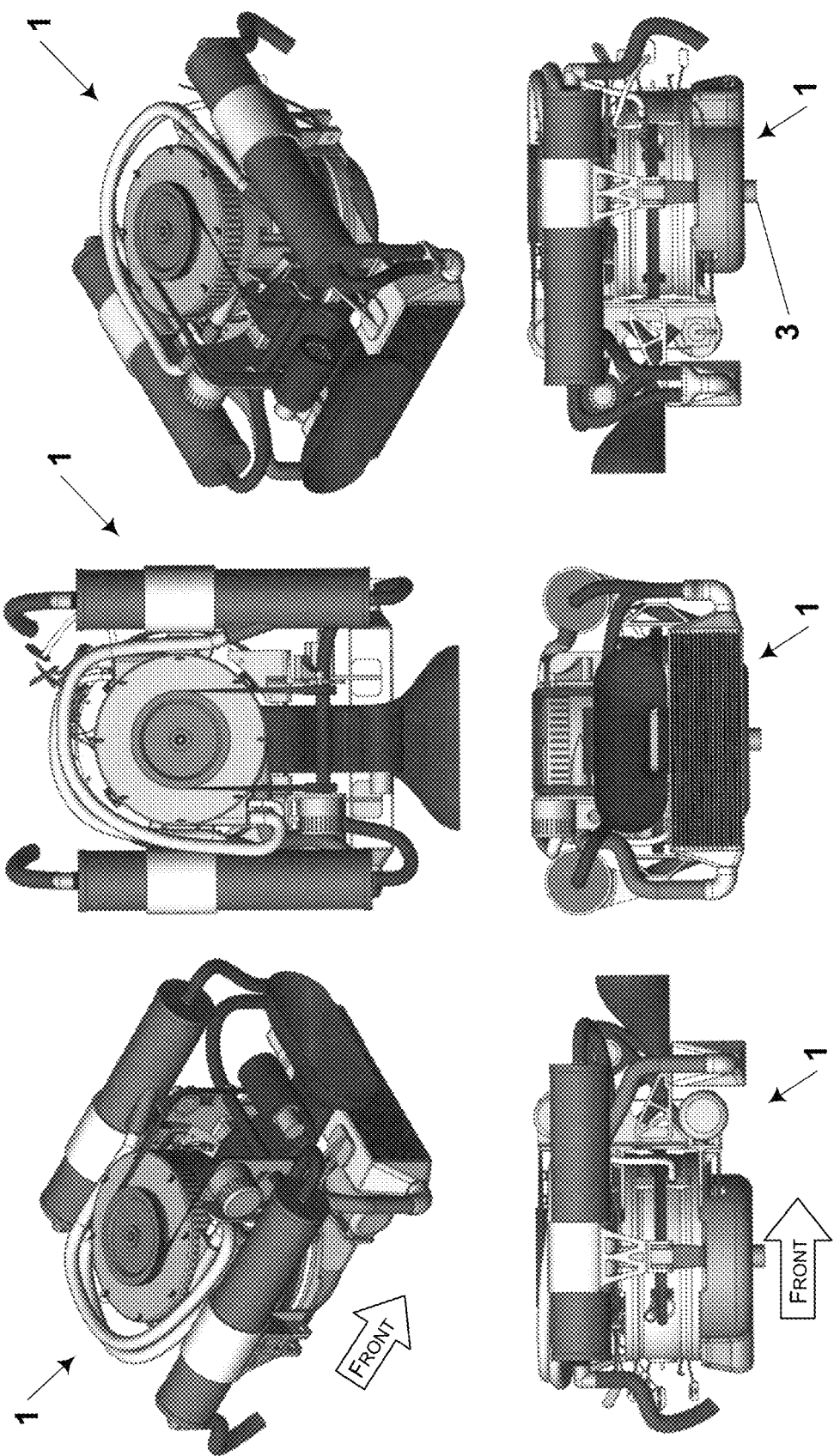
Figure 1E:
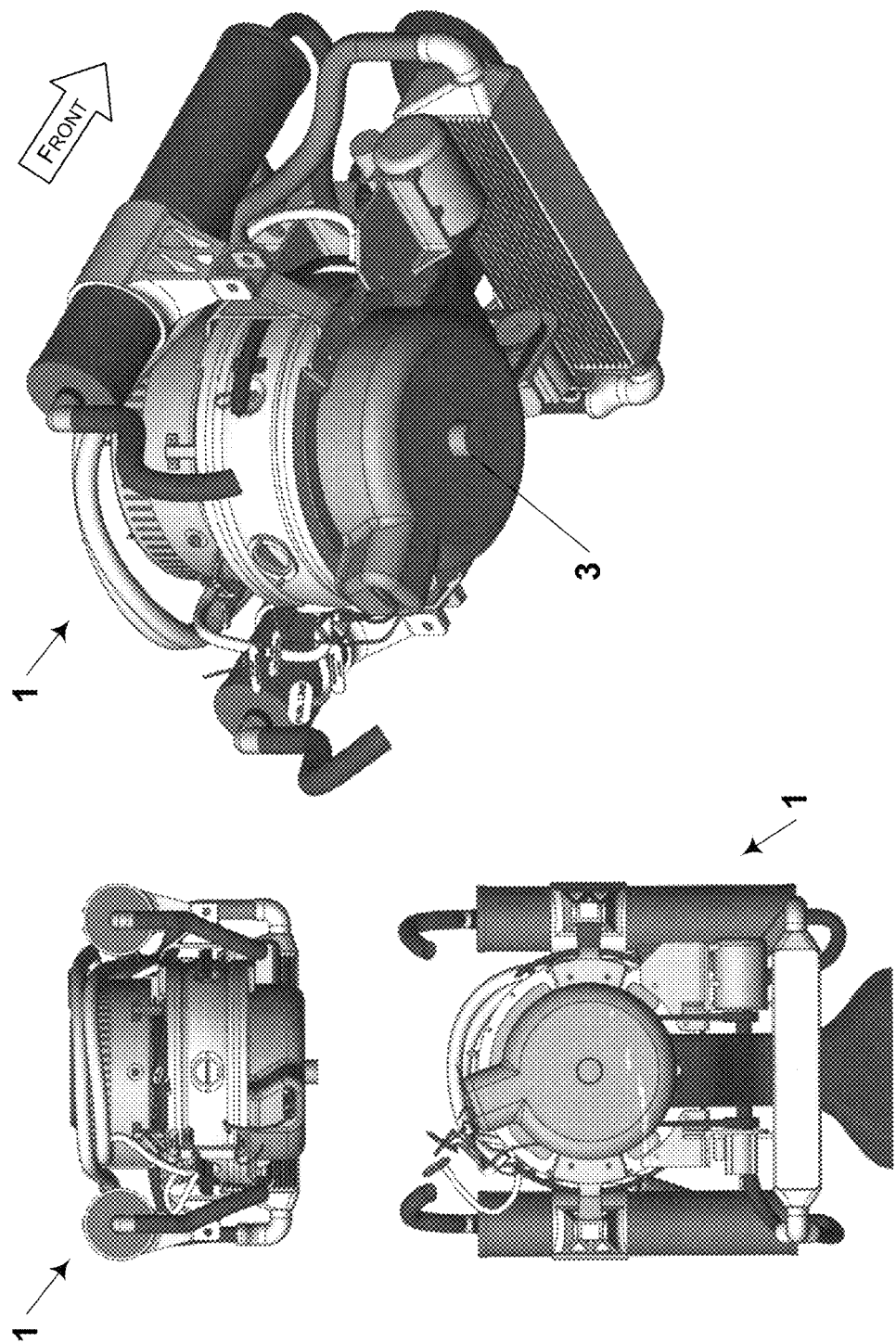
Figure 1F:
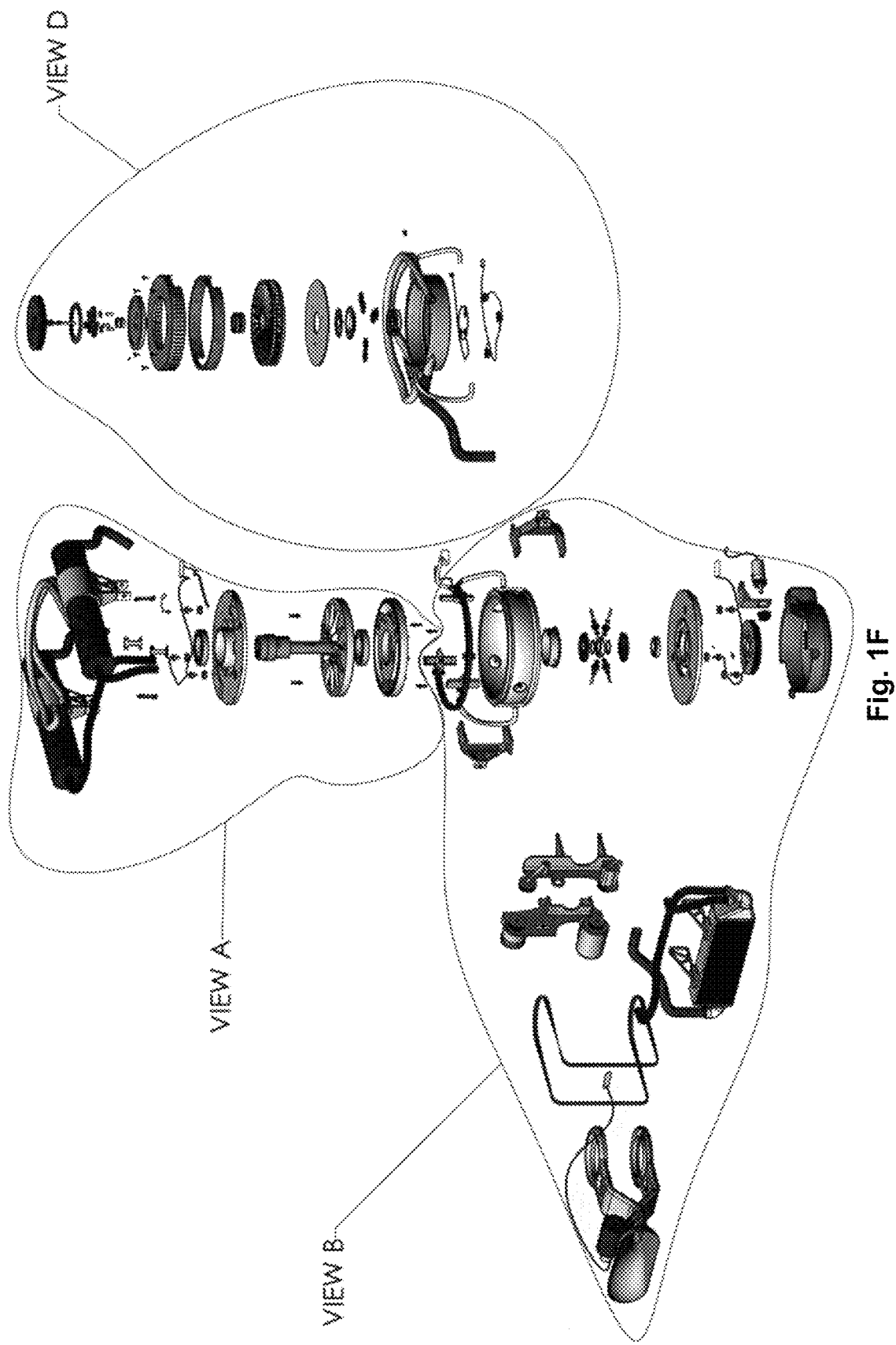
FIG. 1F is a exploded view of the embodiment of the rotary engine of FIGS. 1A-1E.

To begin the discussion of the large version of the engine, refer to FIGS. 1A-1E and detailed views A-F which appear on various figures. The views on FIGS. 1A-1E depict the engine 1 in numerous perspectives. After referring to the detailed views of A-F, one can identify the major external structures: air intake filter with the slots on the side on the top of the engine under the pulley, oxygen concentrator cylinders 4 on either side of the top of the engine, cooling air scoop 11 at the front of the engine with the ducts to the primary and secondary rotors and the blower motor, intercooler radiator 13 at the front lower area with air hoses from the compression chamber and into the oxygen concentration cylinders. The lighter middle area on the right drawing on FIG. 1B is the exhaust manifold 2 and the fuel rail 15 and injectors are located in the middle area of the manifold. The compression chamber is best seen on the right drawing on FIG. 1B below the slots on the air filter. It receives compressed air from the turbine and squirrel cage fan in and below the air filter. It also receives concentrated oxygen from the oxygen concentrators and excess cooling air from the outer margin of the cooling fins in the manifold. The turbine is driven by a belt drive through a pulley and step-up gearbox that increases the rpm tenfold to about 20,000 rpm at cruise speed. The compression chamber combines all the above sources of air and oxygen and directs them through an iris valve into the power shaft of the engine. Sensors at the intake to the power shaft monitor the $O_2$ level, temperature and pressure and feed this information to the engine control module that then controls the iris valve to allow proper air flow and air pressure into the power shaft.

In general terms, a rotary engine according to the principles of this disclosure is illustrated in FIGS. 1A-6K and comprises several sub-systems and components, described in detail below. In terms of structure, the outer plates 77, 80 of the engine do not rotate and do not have a function in the generation of power; they simply direct the air flow over the cooling fins and contain the gases released into the manifold 2. The cooling air then enters the exhaust manifold and drives the stagnant exhaust gases out the exhaust pipe. Some excess cooling air is drawn off the margin of the manifold before it mixes with exhaust gas and this is then fed to the combustion chamber since the cooling air is also pressurized by centrifugal force. The combustion of fuel with hyper-expansion in the combustion chamber drives the rotors in counter-rotation in a continually repeating cycle. The power in the reversed rotation rotor is then reversed to drive the power shaft in the same direction as the primary rotor. This continual combustion and expansion provides torque to the power shaft 3 that extends outward from the lower end of the engine. The power shaft may then be connected by conventional clutch, torque converter, gearbox, differential, alternator or a similar system (not shown for clarity) to eventually drive the wheels of the vehicle. Fuel (any common hydrocarbon fuel such as gasoline, diesel, kerosene or compressed natural gas) is provided by conventional techniques, such as a fuel tank and electric fuel pump, to a fuel injection system that feeds the combustion chamber. Cooled, oxygen-enriched "air" is provided by an oxygen enrichment system which is illustrated as a pair of cylindrical oxygen concentrators. These cylinders remove nitrogen and, thus, increase the oxygen concentration in the air from the ambient air (roughly 21% oxygen, 78% nitrogen, 1% other gases) to approximately 50% oxygen and 50% nitrogen. The oxygen-enriched "air" is then piped to a compression system 5 so that its pressure is increased. The compressed, oxygen-enriched gas then flows into the combustion chambers, as described in more detail below. The rotors compress the air and mix it with fuel injected into the combustion chambers. Ignition of the air-fuel mixture by spark plugs causes hyper-expansion of the combusted gas and this drives the rotors. The power shaft 3 is coupled to a belt 6 that drives other systems such as the electrical alternator 7, power steering pump 8 and a supercharger that feeds air to the oxygen concentrators and the power shaft intake. A conventionally operating idler pulley and tensioner 10 maintain proper tension on the belt 6. An ambient ram air intake 11 with electrical backup fan 12 provides ventilation cooling to the rotors. All cooling air (with the exception of the marginal air from the rotors which is directed to the compression chamber) and all exhaust gas is routed out of the engine through a conventional exhaust system (not shown).

External Engine Structure

The first set of drawings, FIGS. 1A-1E, are of multiple views of the external engine. These views show the engine air filter (with the vertical slots) at the top of the engine. Noted below this filter on the right drawing on FIG. 1B is the exhaust manifold with the fuel rail and exhaust pipe mounting. The dark area below on the right drawing on FIG. 1B is the splash guard covering the starter, starter drive and fan belt pulley. The power shaft 3 protrudes from the bottom of the splash guard. On FIG. 1A are noted the two long oxygen concentration cylinders on the top right and left of the engine. At the front of the engine is a large air scoop, blower and air ducts. Below this is the intercooler for cooling the compressed and hot air from the supercharger turbine. Hoses feed the output of cool air to the oxygen concentrators. Concentrated oxygen leaves the cylinders at the outflows on the sides of the cylinders and flows to the compression chamber which is located immediately below the air filter (the solid round area beneath the air filter slots). On FIG. 1E the lower aspect of the right drawing shows the fan belt leaving the front of the splash guard where it is driven by a pulley on the power shaft. The serpentine belt can be seen on numerous views winding from the bottom of the engine up the front of the engine while driving the auto accessories and ending at the large pulley at the top of the engine. This pulley drives the squirrel cage fan and turbine located below the air filter.

Compression Chamber

Figure 2A:
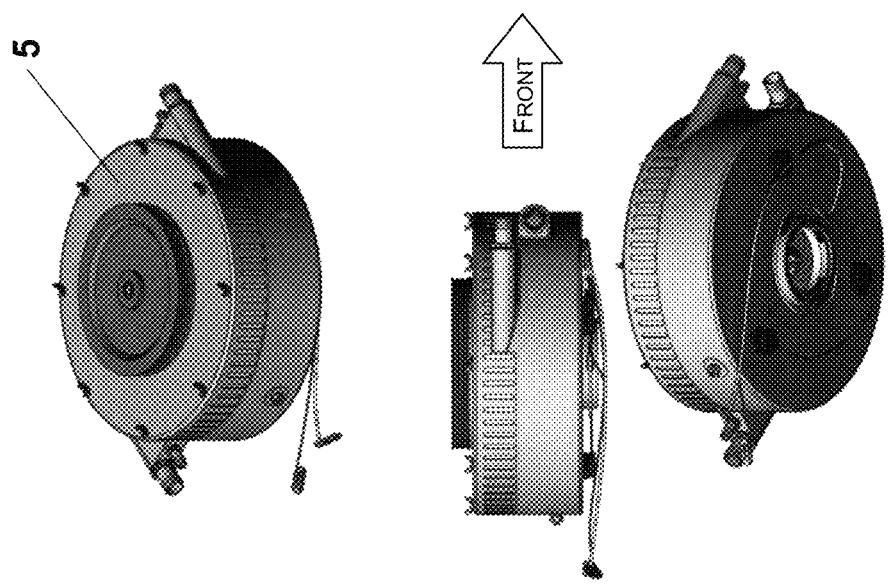
FIG. 2A includes various views of a component of the rotary engine of FIGS. 1A-1E.
Figure 2A:
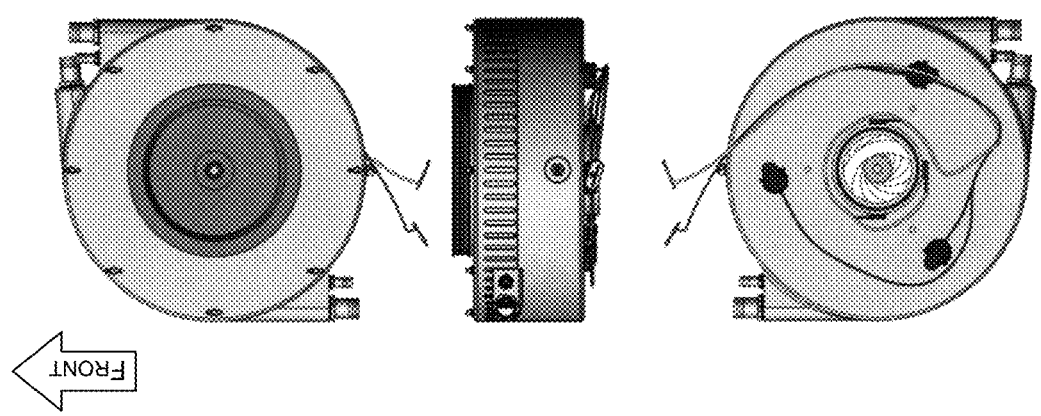
Figure 2A:
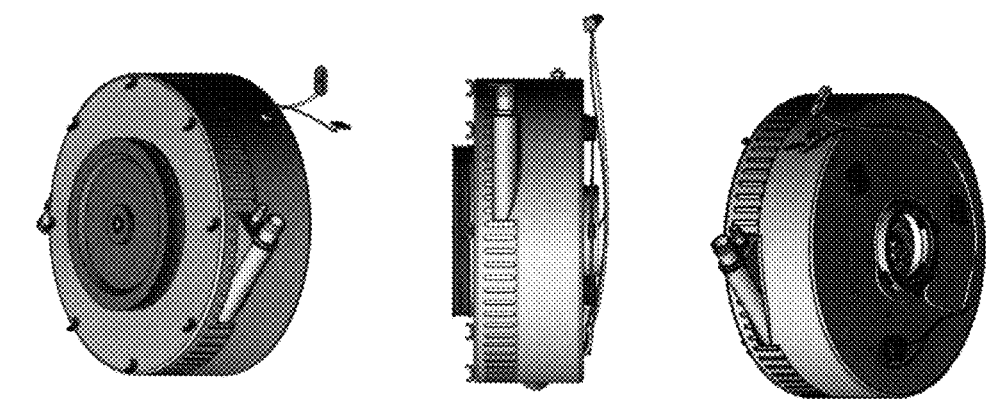
Figure 2B:
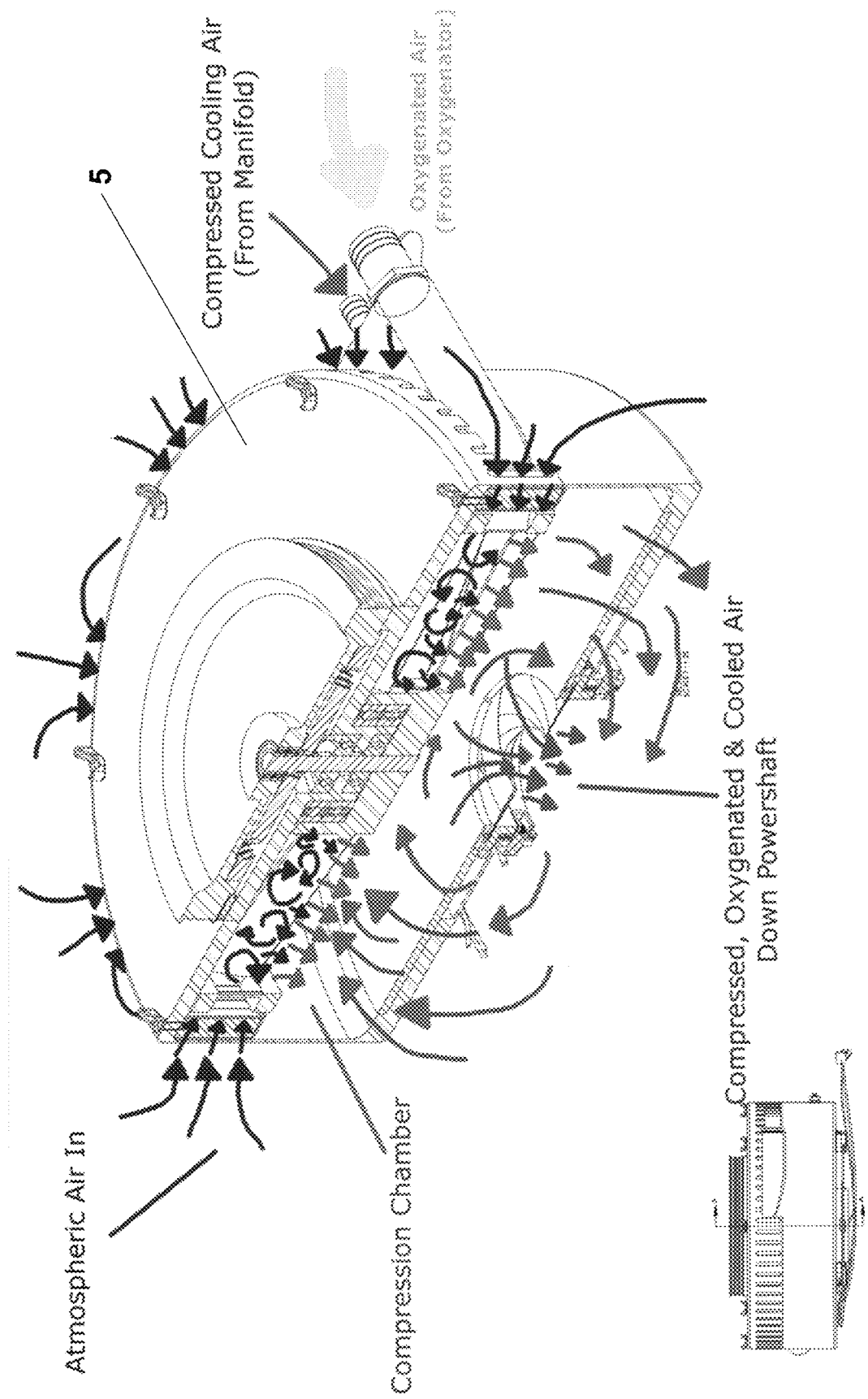
FIG. 2B is a annotated cross-section of a portion of the rotary engine of FIGS. 1A-1E.

FIGS. 2A-2B illustrate the structure and function of the compression chamber 5. The area immediately below the air filter is seen best on FIG. 2A.

Combustion and Cooling Air Flows

Figure 3B:
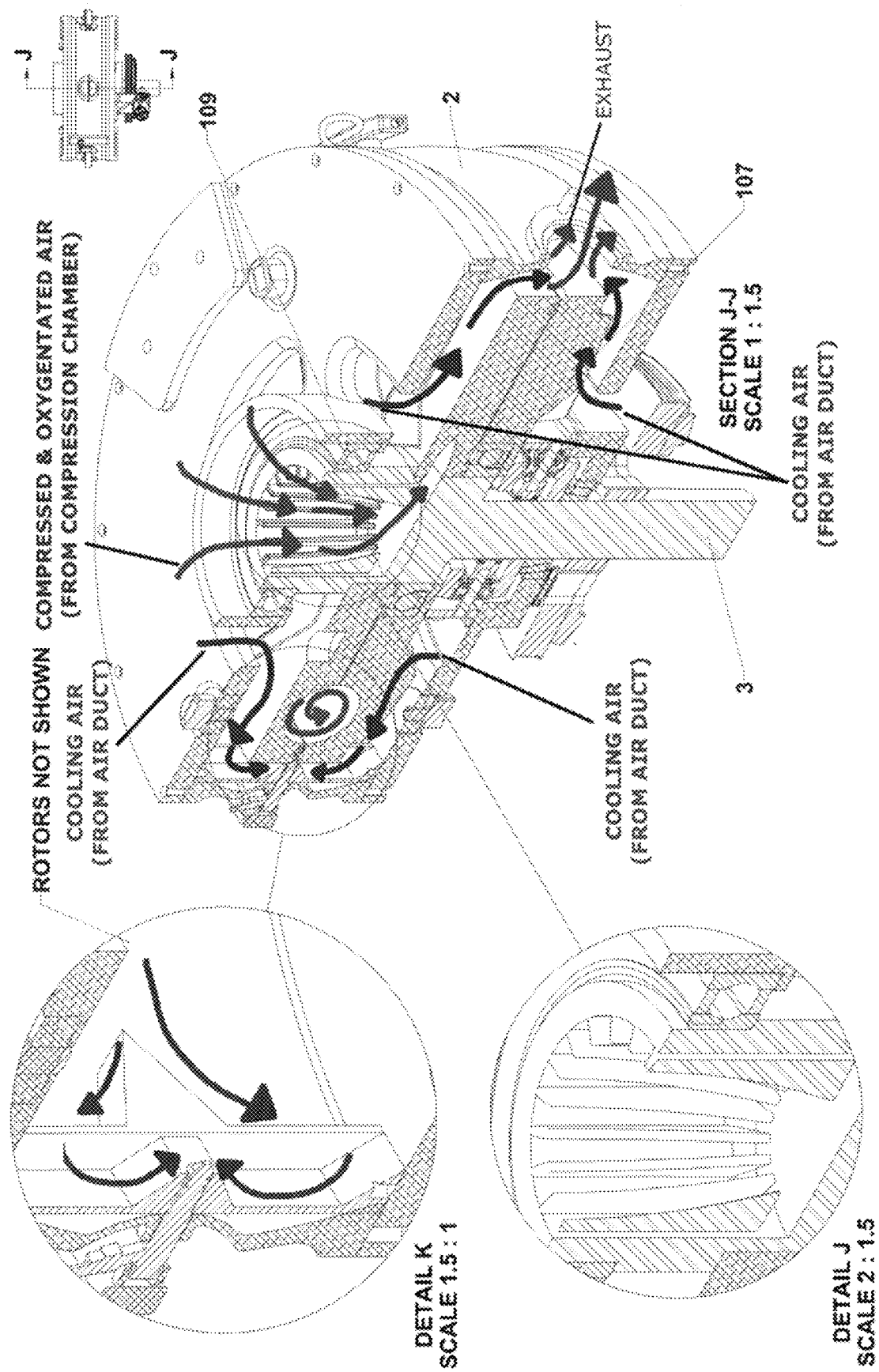
FIG. 3B is a annotated perspective cross-section of the portion of the rotary engine of FIG. 3A, taken along the line 3B-3B of FIG. 3A.
Figure 3C:
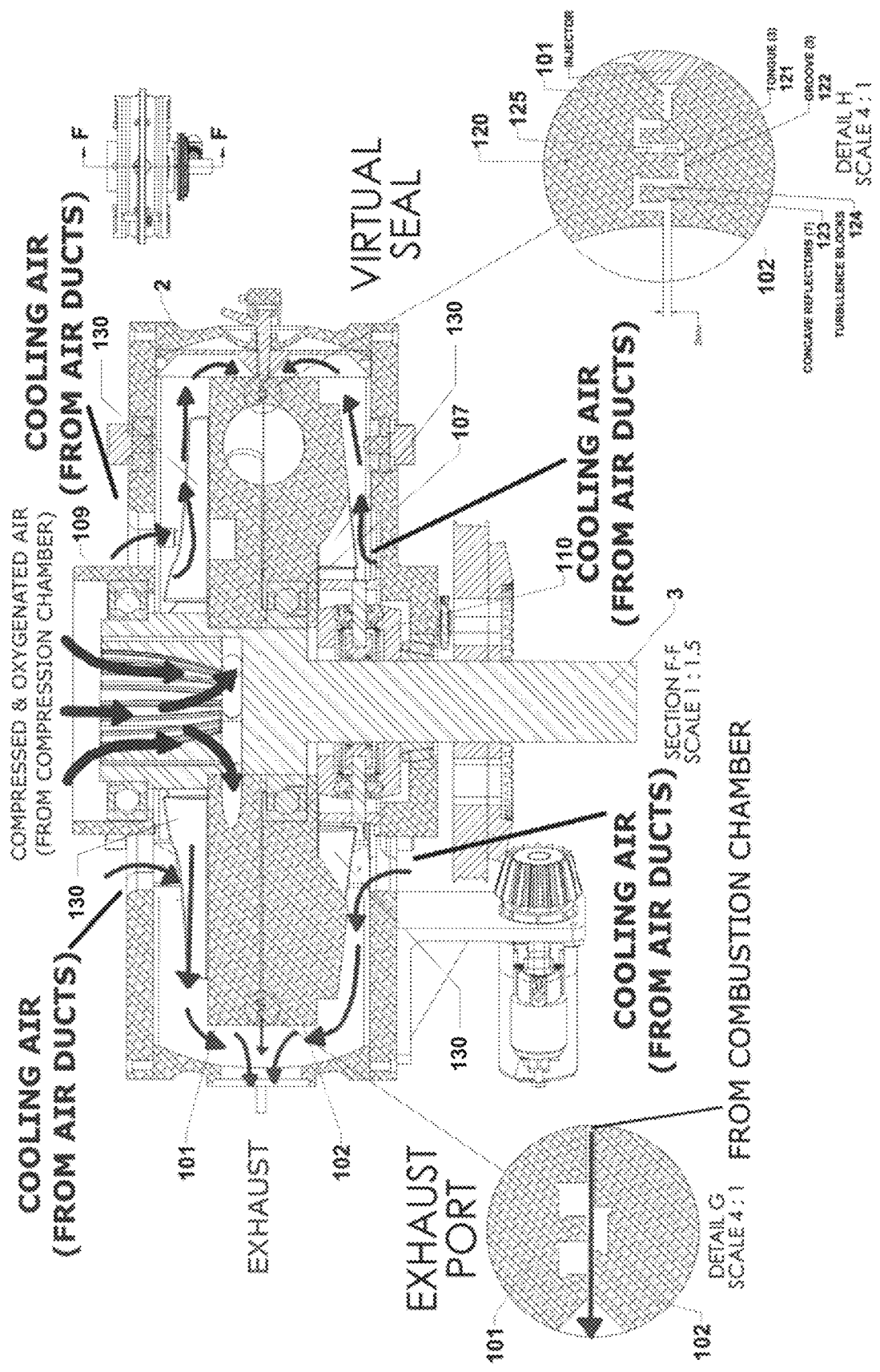
FIG. 3C is a annotated side cross-section of the portion of the rotary engine of FIG. 3A, also taken along line 3B-3B of FIG. 3A.
Figure 3D:
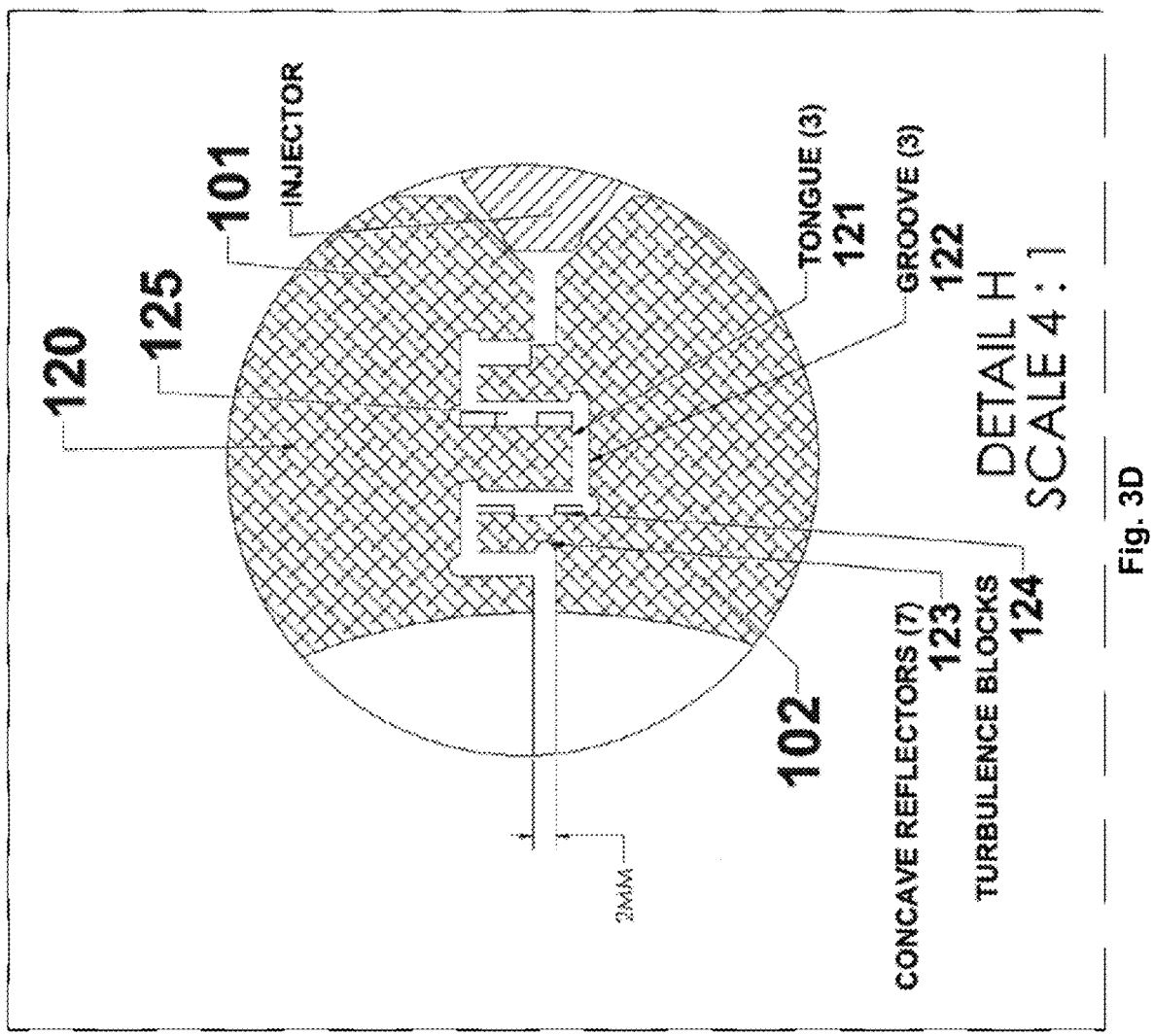
FIG. 3D is an enlargement of a portion of FIG. 3C.

Next refer to FIGS. 3A-3C. FIG. 3A depicts the top of the power shaft which is located immediately below the iris valve and the compression chamber. Air leaves the compression chamber with high pressure and high oxygen content and the flow is regulated by the iris valve so that when the final centrifugal and ram compression are completed in the combustion chamber the pressure does not exceed 150 lbs. per square inch or a compression ratio of ten to one for the gasoline, spark-ignited version of the engine. In the diesel version, with compression ignition, the pressure is allowed to rise to a final compression ratio of 25-30 to one.

It may be noted that the inside of the power shaft has fins lining the walls. The fins widen as they progress from the inlet of the power shaft to the air intake ports in the primary rotor. As the air moves down the power shaft, it is increasingly funneled by the widening fins and the narrowing central space FIG. 3B, Detail J. This causes the air to be "shaved down" and thrown by centrifugal force to the outer wall of the shaft. It then moves down the channels between the fins and is drawn into the air intake ports by the negative pressure around them. This negative pressure is generated by the centrifugal force that drives the air down the air ducts to the compression cylinders. Since the air is spinning at the speed of the power shaft, it does not meet a "wall of steel" as it enters the air intake ports. Once in the compression cylinders, the air is further compressed by centrifugal force and ram compression.

FIGS. 3A-3C illustrate the flows of combustion air and cooling air within the engine 1. For clarity, FIG. 3A omits the compression chamber 5 (of FIG. 2A) and other components to illustrate the flow of compressed and oxygenated air as it exits the compression chamber, travels down the power shaft 3 and enters each of three intake ports in the primary rotor. FIGS. 3B and 3C also illustrate this flow and additionally illustrate the flow of ambient cooling air-flow over the outer surfaces of the rotors and cooling fins 130, thereby cooling the rotors, and then flows into the exhaust manifold.

Another important aspect of the engine is the cooling system that operates by air flowing over the cooling fins 130 on the outside of the rotors. The air is fed to the center of the rotors by ducts and then is driven past the cooling fins 130 by centrifugal force. There is a backup blower to move additional air under very hot conditions. The cooling air is then vented into the exhaust manifold where it is partially channeled over the fuel injector tips to keep them cool and is also partially bled off into the compression chamber. The cooling air then forces the stagnant exhaust gas out the exhaust pipe.

There are two different and distinct airflows through the engine: one is for combustion in the combustion chambers; a second is for cooling the rotors. FIGS. 3A-3C depict these separate airflows. FIG. 3A simply shows the engine with the air stack removed so that the power shaft with the air intake is exposed. Air flows into the power shaft from the compression chamber after passing through the iris valve immediately above it. FIG. 3C shows the air entering the power shaft and then the air ducts. FIG. 3B shows that this air flows into the combustion chambers and then passes out through the exhaust port and into the manifold. The cooling airflow is noted entering through air intake slots on the outer plates above and below the rotors on FIG. 3C. This air then flows over the outer rotors and over the cooling fins 130 and exits into the manifold as shown on FIG. 3B. Detail figures G and H of FIG. 3C show the virtual seal 120. Detail K of FIG. 3B is a cutaway view of the cooling air that is captured in a channel in the manifold and is directed over the fuel injector tips to keep them cool. A wedge in the linear gas flow around the outer rotors splits the exhaust and drives it away from the injectors. The exhaust manifold thus carries the engine exhaust and the engine cooling air. The flow of cooling air is necessary to drive the exhaust out of the manifold since the exhaust gas has no further expansion pressure to push it.

Outer Plates and Rotors

FIGS. 3A-3C also illustrate that the engine outer plates act to house the pair of rotors 100, specifically the primary rotor 101 and the secondary rotor 102, and to direct the cooling air flow over the outer rotors and cooling fins DO and into the exhaust manifold. The outer plates also mount the engine power shaft bearings and accept the motor mounts. The primary rotor 101 is pressed onto the power shaft 3 and they move together as a unit in the power shaft bearings 109. The secondary rotor 102 is coupled to the power shaft by a reversing gearbox 110 and is free to rotate by virtue of being mounted on a secondary rotor bearing 107 on the power shaft. The secondary rotor bearing 107 is mounted within opening 108 (FIG. 5A, not shown in FIGS. 3A-3C) in the secondary rotor 102.

Other Engine Systems and Components

Figure 4A:
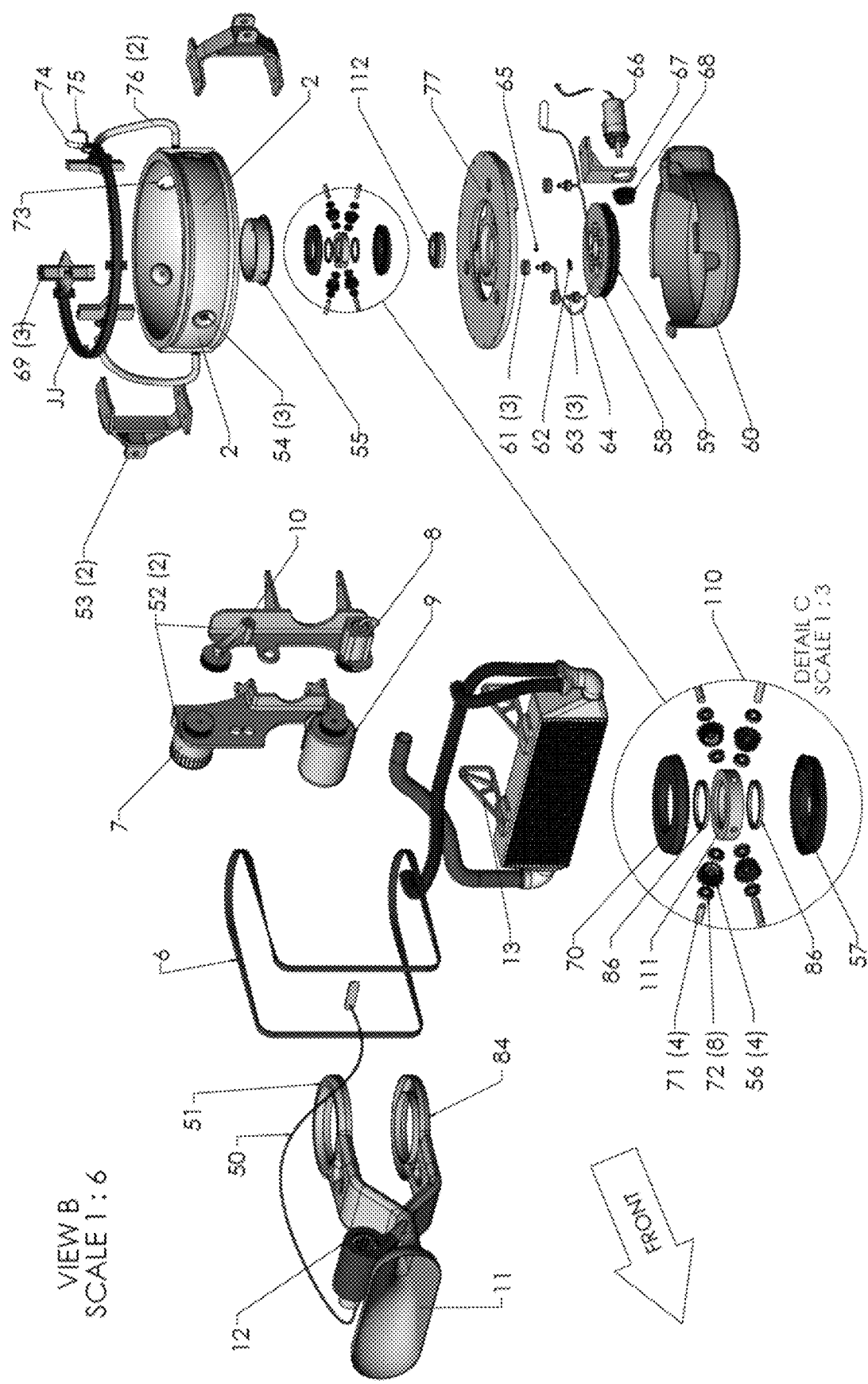
FIGS. 4A and 4B are exploded views of other portions of the rotary engine of FIGS. 1A-1E. See Tables 2 and 3 for reference letters. Quantities are in parentheses.
Figure 4B:
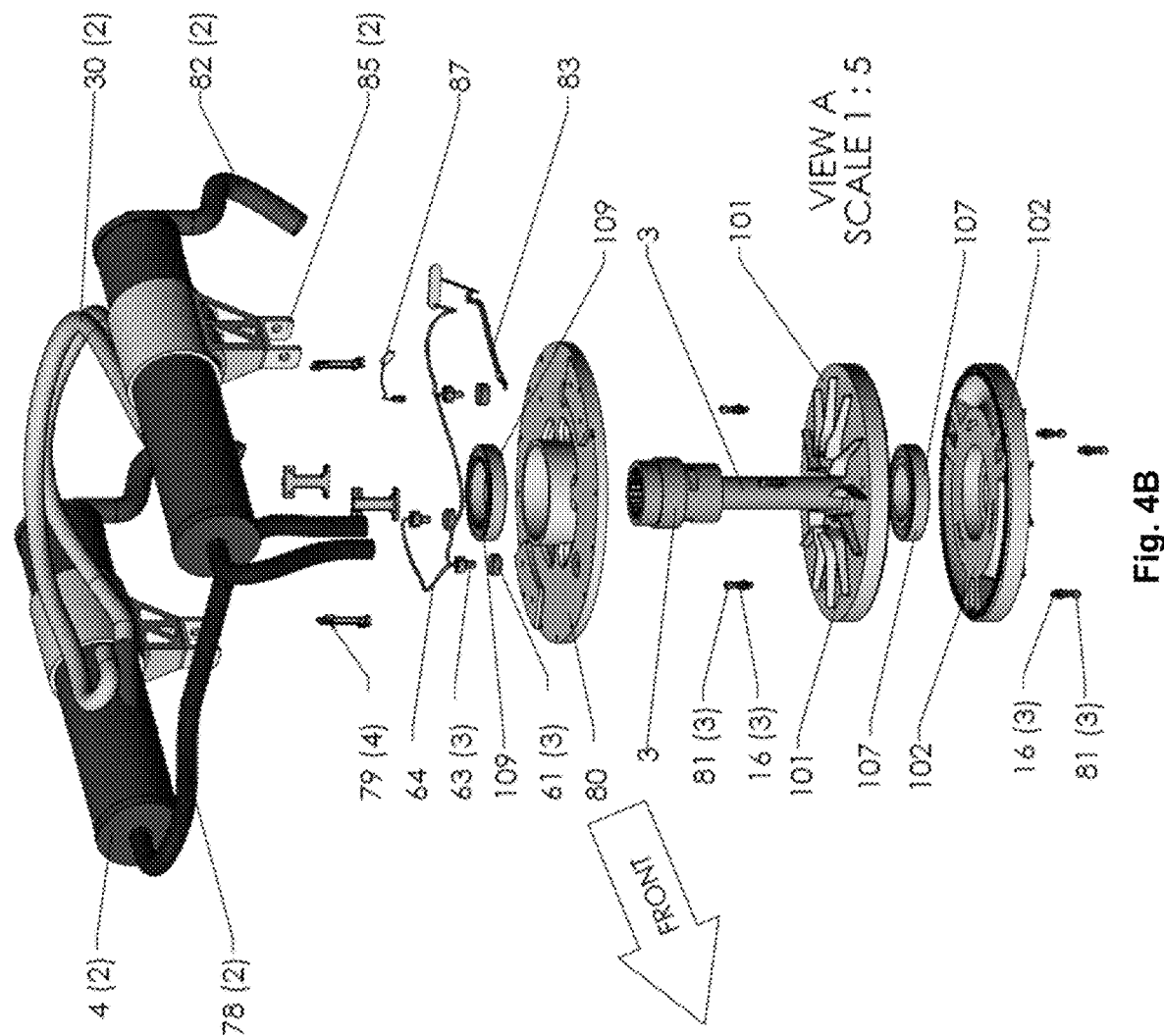

FIGS. 4A and 4B illustrate other components of the engine 1.

To review the inner structure of the engine, refer to the exploded views A-F on various Figures. View A (FIG. 1F) shows the upper power shaft, the two rotors and the top outer plate. FIG. 4B details the breakdown of view A. The top outer plate is noted in the middle of the figure with the power shaft just below it. Above the top outer plate are the spark plug wires, "rotor plugs," upper power shaft bearing and rotor plug inserts. The "rotor plugs" are spark plugs with the cathode contact removed; the spark plugs have anodes made of round hard metal disc. The disc is resistant to electrical arcing. The round anode contact is wide enough to accommodate current transfer from full advancement to full retardation of the engine timing. Above these are the oxygen concentrators, hoses, oxygen concentrator and engine mounts, compression chamber mounts and the infrared sensor. Just below the top of the power shaft are the two rotors, secondary rotor bearing and two sets of spark plugs and rotor plugs for the primary and secondary rotors.

View B (FIGS. 1F and 4A) shows the manifold, fuel rail, fuel injectors in the manifold, bottom outer plate, reverse power gearbox, starter and starter gear, splash shield, engine mounts, cooling ducts and air scoop, drive belt, intercooler and auto accessories. Detail C (FIG. 4A) shows further breakdown of the gears, shafts, bearings, seals and spider of the lower (reverse power) gearbox.

View D (FIG. 2C) breaks down the air stack from the top power pulley that turns the supercharger to the compression chamber housing on the bottom that receives the compressed, oxygenated and rotor cooling air. Beginning at the top of View D, the turbine shaft is turned by the pulley that receives power from the power shaft at the bottom of the engine. This shaft then turns the squirrel cage fan that pulls air in through the air filter. It also turns the turbine immediately below the squirrel cage fan. The air that is compressed by this fan and turbine are driven into the compression chamber housing just below the turbine. Oxygen, temperature and pressure sensors monitor the gas that then passes through the iris control valve and enters the power shaft of the engine. A pressure relief valve on the compression chamber keeps the pressure at 150 pounds per square inch (10 atmospheres). Detail F gives a further breakdown of the iris valve components showing the valve leaves, iris socket, iris valve, ring gears and shafts, seals and bearings.

Rotors in General

Figure 5A:
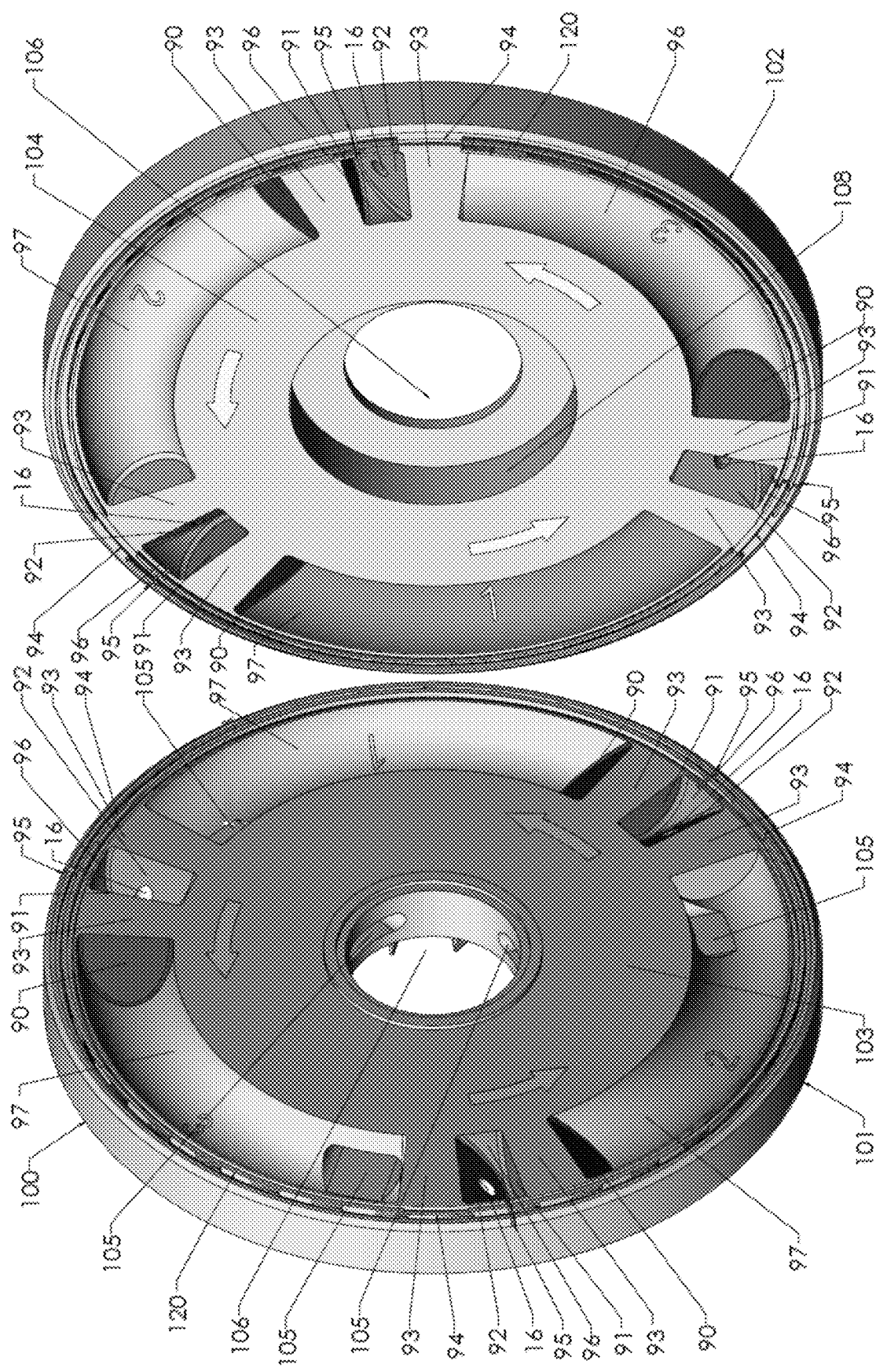
FIGS. 5A and 5B illustrate an embodiment of primary and secondary rotors suitable for embodiments such as illustrated in the other Figures, in which the rotors are arranged "face-to-face" for purposes of illustration only. For purposes of clarity only.

The final set of drawings defines the power cycle of the engine. On power cycle schematic drawings 5A and 5B the inner structure of the two rotors is shown. Both rotors have identical inner structures except for the air intake ports on the primary rotor (left diagram) and the recess for the bearing on the secondary rotor (right diagram). FIG. 5A is shaded to help illuminate the curved inner structures. These drawings each show the following structures: compression cylinders, combustion chambers, compressed air intake ports (left primary rotor only), expansion blocks, pistons, power reflectors, spark plugs, injector ports, air plows, bearing recess (right secondary rotor only), and exhaust ports. Each rotor has three each of these: compression cylinders, combustion chambers, pistons, power reflectors, injector ports, spark plugs, air plows, and exhaust ports. Each rotor has six expansion blocks, one on each end of the combustion chambers on each rotor. The virtual seal 120 on the margin of the rotors is also noted. The arrows denote the counter-rotation of the rotors.

Figure 5B:
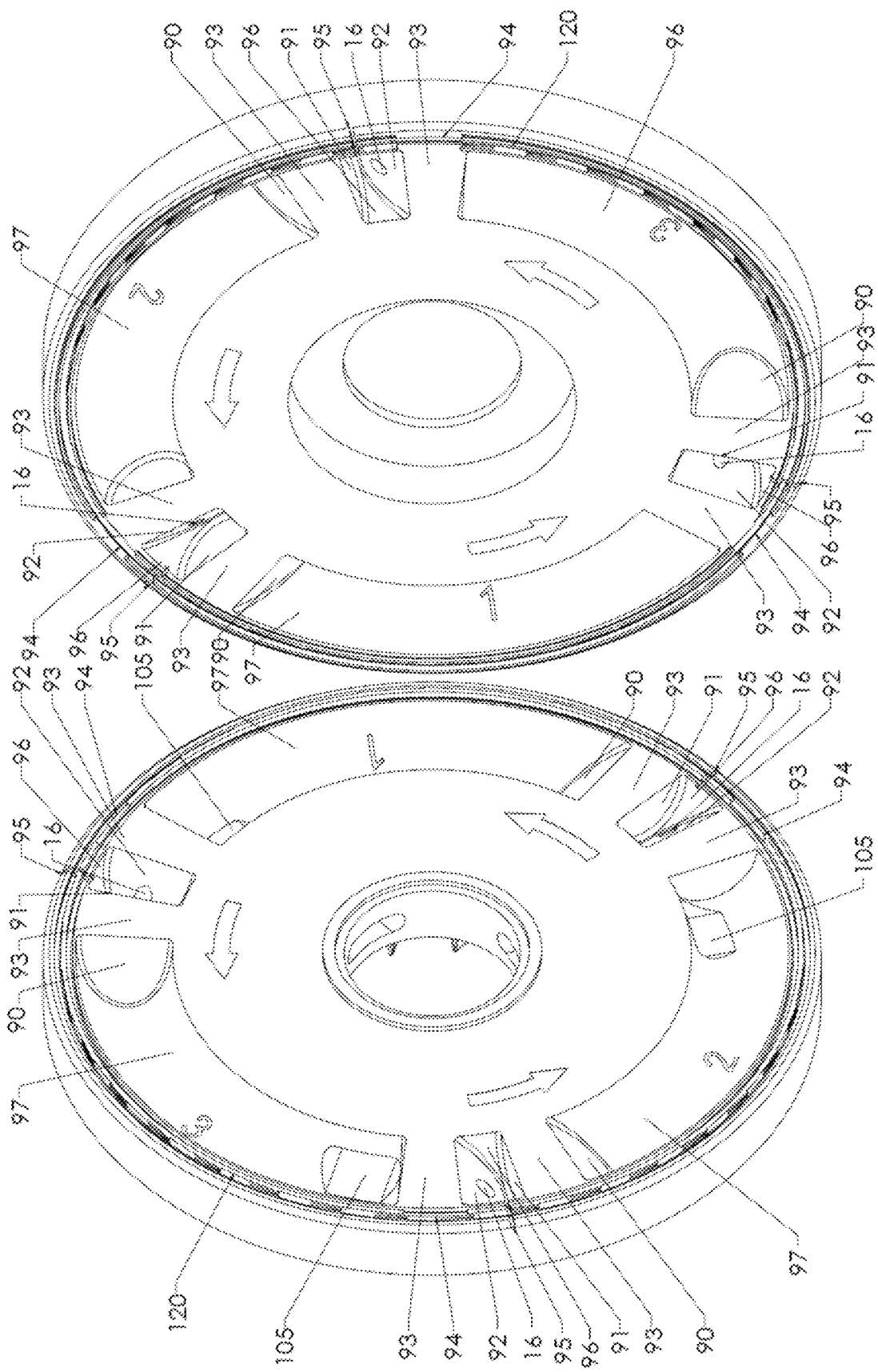

FIGS. 5A and 5B illustrate general structural details of the pair of rotors 100, specifically primary rotor 101 and secondary rotor 102, arranged with respect to each other to illustrate the correspondence of various features of each on the respective interiorly-facing surfaces of each rotor (i.e., the inner or "lower" surface 103 of the primary rotor 101 and the inner or "upper" surface 104 of the secondary rotor 102). The rotors are generally mirror images of each other, although a notable exception is that only the primary rotor has compressed air intake ports and ducts 105 through which air passes from the central opening 106 to one end of each of the compression cylinders. Another difference is that the secondary rotor is mounted on a secondary rotor bearing 107 (FIG. 4B, not shown in FIGS. 5A and 5B) which mounts in opening 108. The power is then reversed to drive the power shaft 3 (FIG. 4B, not shown in FIGS. 5A and 5B) in the same direction as the primary rotor 101.

The internal operation of the engine is best understood by reviewing the drawings of the power cycle schematics on FIGS. 6A-6K. FIGS. 5A-5B illustrate the inner mechanics of the engine. In this version there are three compression cylinders and three combustion chambers. Each combustion chamber is formed from two hemi combustion chambers that are in the outer margins of the rotors. Each hemi combustion chamber has a flat end (piston) that drives the rotor in the indicated direction and a 45 degrees slanted end that reflects the power on the trailing half of the chamber to the opposing hemi combustion chamber and adds to the power driving the opposing hemi combustion chamber in the opposite direction. There is one spark plug in each hemi combustion chamber, two per combustion chamber. There are three air intake ports in the primary rotor that open to the "upwind" end of the compression cylinders. There are two expansion blocks, one on each end of the hemi combustion chamber, that serve to seal each hemi combustion chamber with air and then are used to allow the combustion chambers to hyper-expand after combustion and full expansion is completed. There is one air plow on the trailing end of each of the compression cylinders and it serves to further compress the air and drive it across to the opposing hemi compression cylinder and then back across again into the hemi combustion chamber on the original rotor.

Rotor Materials

Each rotor is preferably, but not necessarily, constructed of an alloy chosen to have a balance of strength, heat resistance and low coefficients of expansion and friction. Each rotor's inner surface (and the accompanying features of the same) must be manufactured, coated, treated or otherwise provided with a hard, low-friction surface which will accommodate the heat and pressure experienced as the inner surfaces move past each other during rotation of the rotors and combustion. The preferred, but not essential, approach is to provide each rotor's inner surface with a layer of ceramic alloy, most preferably an alloy comprising boron, aluminum and magnesium (so-called "BAM" material) having the nominal chemical formula of $AlMgB_{14}$ (or more specifically $Al_{0.75}Mg_{0.75}B_{14}$). One suitable alloy comprises BAM and titanium diboride which has a coefficient of friction (COF) of only 0.02, substantially less than other materials such as polytetrafluoroethylene [TEFLON®] (COF of 0.05) or lubricated steel (COF of 0.16). The BAM layer may be a nanolayer having a thickness on the order of 0.05 milliliter. It may be applied by any conventional process known to be suitable for the application, such as pulsed laser sintering or magnetron sputtering.

Virtual Seal

As illustrated in FIGS. 5A and 5B (see also Detail H on FIG. 3C and especially on FIG. 3D), another feature of each rotor is a virtual seal 120 in the form of a set of generally circumferential tongues 121 and grooves 122 around the outermost extent of each rotor that interlace with each other when the rotors are assembled with their respective inner surfaces facing each other. There are three such tongues 121 and grooves 122 in the set formed in the primary rotor 101 and two in the set formed in the secondary rotor 102. When the two rotors are arranged face-to-face, the tongues and grooves are interspersed such that the tongues and grooves of the secondary rotor 102 extend into the tongues and grooves of the primary rotor 101. The heights of the tongues and grooves are such that a passage 125 with eight 90-degree turns is formed between them. At the beginning of each 90-degree turn are concave reflectors to slow the passage of gas. Also, in the passages are turbulence blocks that create "mini vortices" to further slow the passage of escaping gas.

Rotor Relative Position as Related to the Combustion Cycle

FIGS. 6A-6K schematically illustrate the positions of the rotors of FIGS. 5A and 5B relative to each other during one cycle of an exemplary operating sequence or "combustion cycle" (which, as discussed in detail below, corresponds to the conventional four-stroke cycles of intake, compression, power and exhaust).

As illustrated, the two rotors define 3 combustion chambers (sets 1, 2 and 3). In FIGS. 6A-6K the interaction of set 1 is specifically described, but the other two sets are similarly arranged and interact with each other in the same manner and in the same sequence. Each rotor rotates one-third of a complete revolution (i.e., 120 degrees) during a single power cycle. Thus, one complete revolution of each rotor returns the rotor back to its initial position after three combustion cycles. Notably, however, the hemi combustion chambers change from cycle to cycle during one complete revolution. That is, after the hemi combustion chambers 1-1, 2-2 and 3-3 are matched to each other in the first of three combustion cycles as illustrated in FIGS. 6A-6K; the second combustion cycle matches together hemi combustion chambers 1-2, 2-3 and 3-1; the third combustion cycle matches together hemi combustion chambers 1-3, 2-1 and 3-2. Then the pattern repeats over the course of the next revolution.

Each rotor has an inner surface that faces the other rotor. The topology of each surface defines various features located around the general vicinity of the outer circumference of each rotor. Such features include recesses in the rotor's inner surfaces (which recesses form volumes known as compression cylinders and combustion chambers), ports (passages between recesses and other volumes such as exhaust ports and injection ports), and expansion blocks (non-recessed regions between recesses). With respect to such circumferentially arranged features, the rotors are mirror images of each other and, thus, immediately adjacent features may be referred to either separately or collectively as a single feature depending on the context. For example, each rotor has a "hemi" combustion chamber, two of which may (depending on the relative rotation of the rotors with respect to each other) form a single chamber known as a "combustion chamber", which chamber is essentially cylindrical in a cross-sectional view taken along the radius of the rotors.

The larger recess in each rotor surface is a compression cylinder. One end of a compression cylinder has a compressed air intake port and the other end has an air plow.

The smaller recess in each rotor surface is a hemi combustion chamber. On one end of a hemi combustion chamber is a piston surface and on the other, opposite end, is a power reflector surface. Within the power reflector surface is an opening for a spark plug. Within the radially outermost side of each combustion chamber is an injector port, which is a pair of circumferentially aligned openings in each of the five teeth forming the virtual seal.

Between each of the compression cylinders and the combustion chambers is an expansion block, which is a region of the rotor surface that is not recessed. An injection port is formed during the closure of the combustion chamber when the gaps in the teeth of the two counterrotating virtual seals overlap, allowing the injectors to inject fuel (see also FIG. 6E). An exhaust port is formed at the end of the expansion of the power cycle when the gaps in the teeth of the two counterrotating virtual seals overlap, allowing the exhaust gas to be expelled into the manifold. This occurs at the "end" of each full set of rotor features, i.e., the expansion block located between the "trailing" combustion chamber of the first group (the end having a power reflector) and the "leading" compression cylinder of the second group (the end having a compressed air intake port).

Combustion Cycle

FIGS. 6A-6K illustrate the power cycle from air entry into the compression cylinders to the exhaust through the exhaust ports. It should be noted that these are clamshell opposed views and that; while the rotation arrows appear in the same direction, the rotors are actually counterrotating. It is assumed that the engine is running and that the rotors are spinning in opposite directions. Air movement is depicted by the arrows and lighter arrows depict less dense air and darker arrows depict denser compressed air. It should be noted that when the engine is running, the rotors are directly opposed to each other and the compression cylinders are a unified cylinder and air can move directly from one side to the other.

Figure 6A:
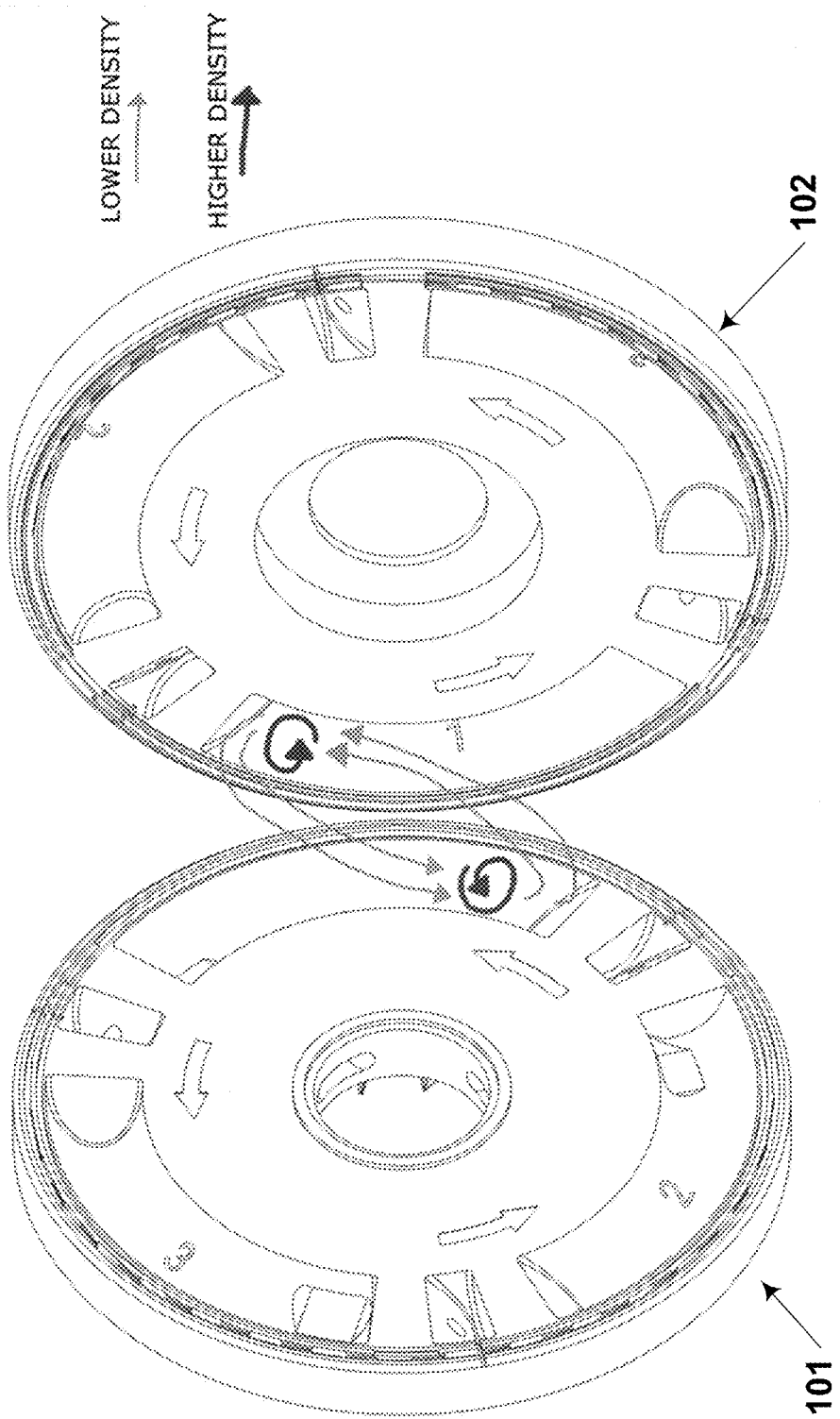
Figure 6B:
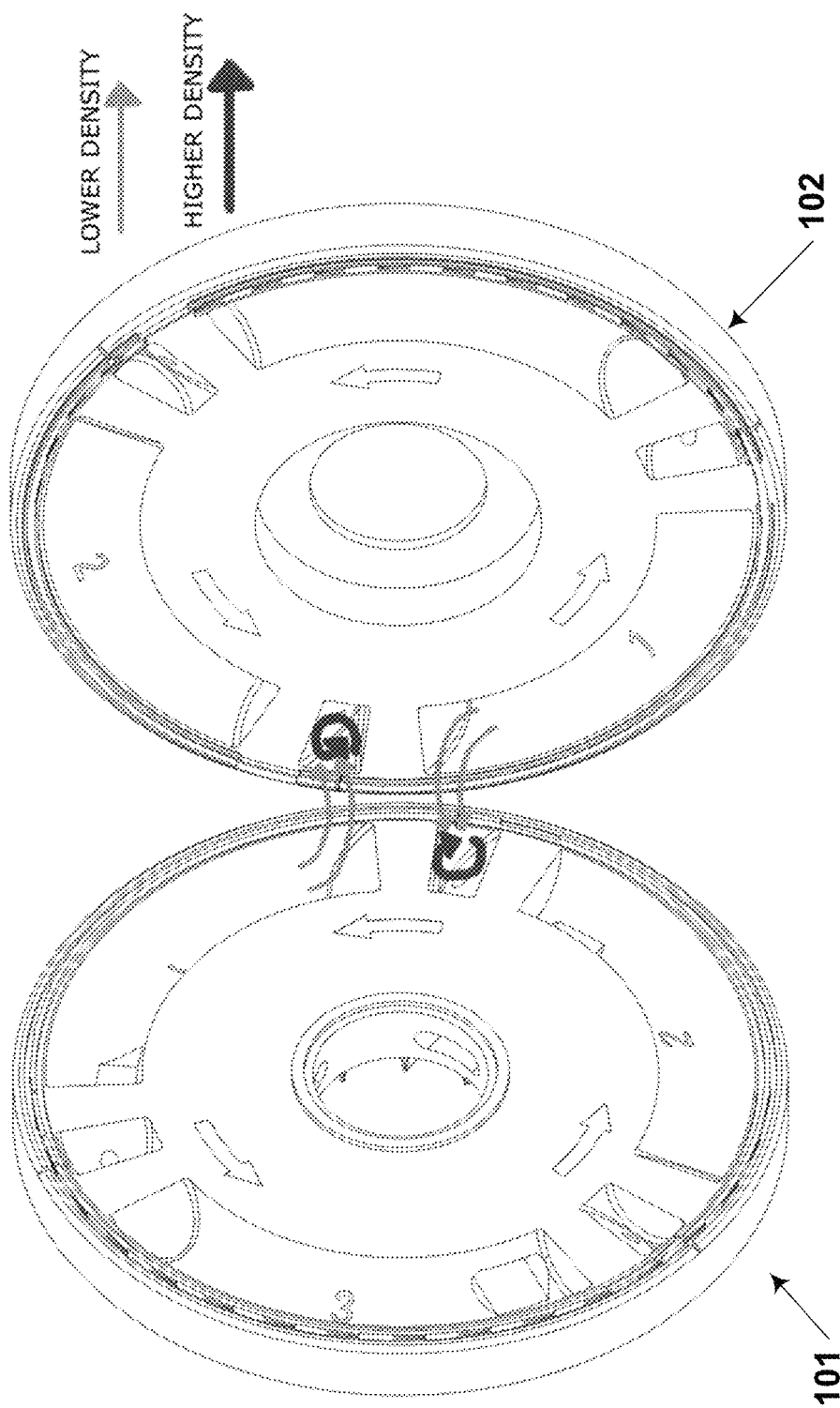
Figure 6C:
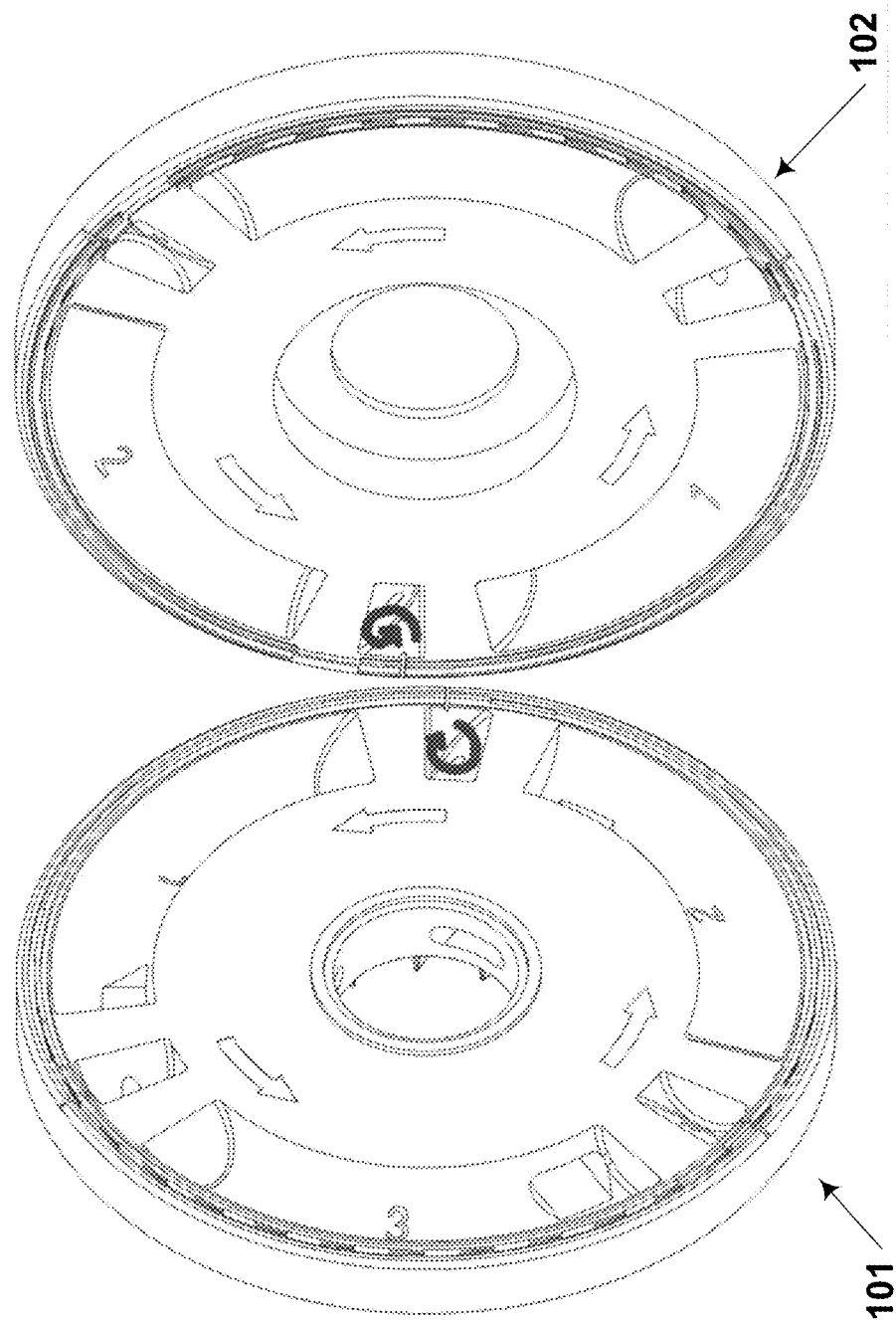
Figure 6E:
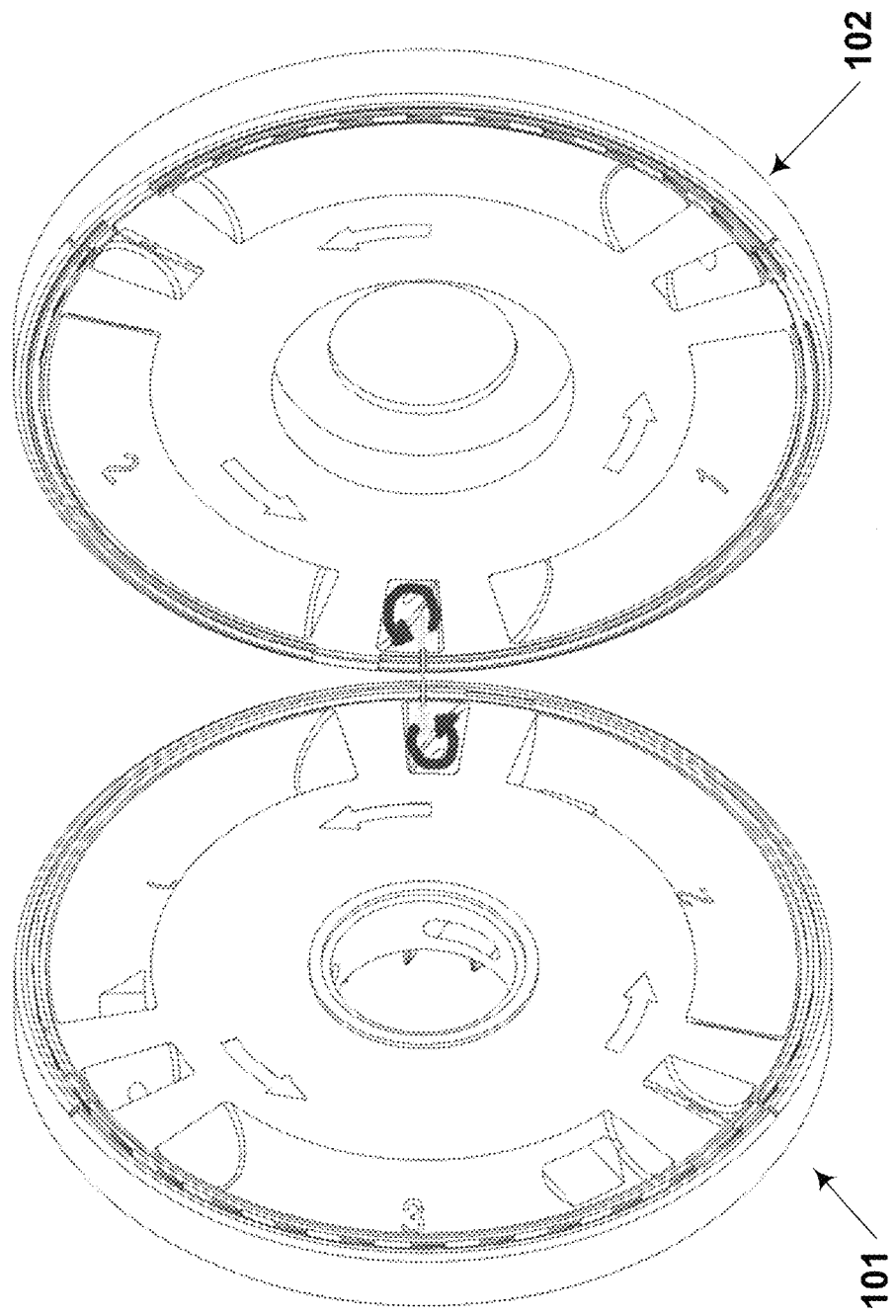
Figure 6F:
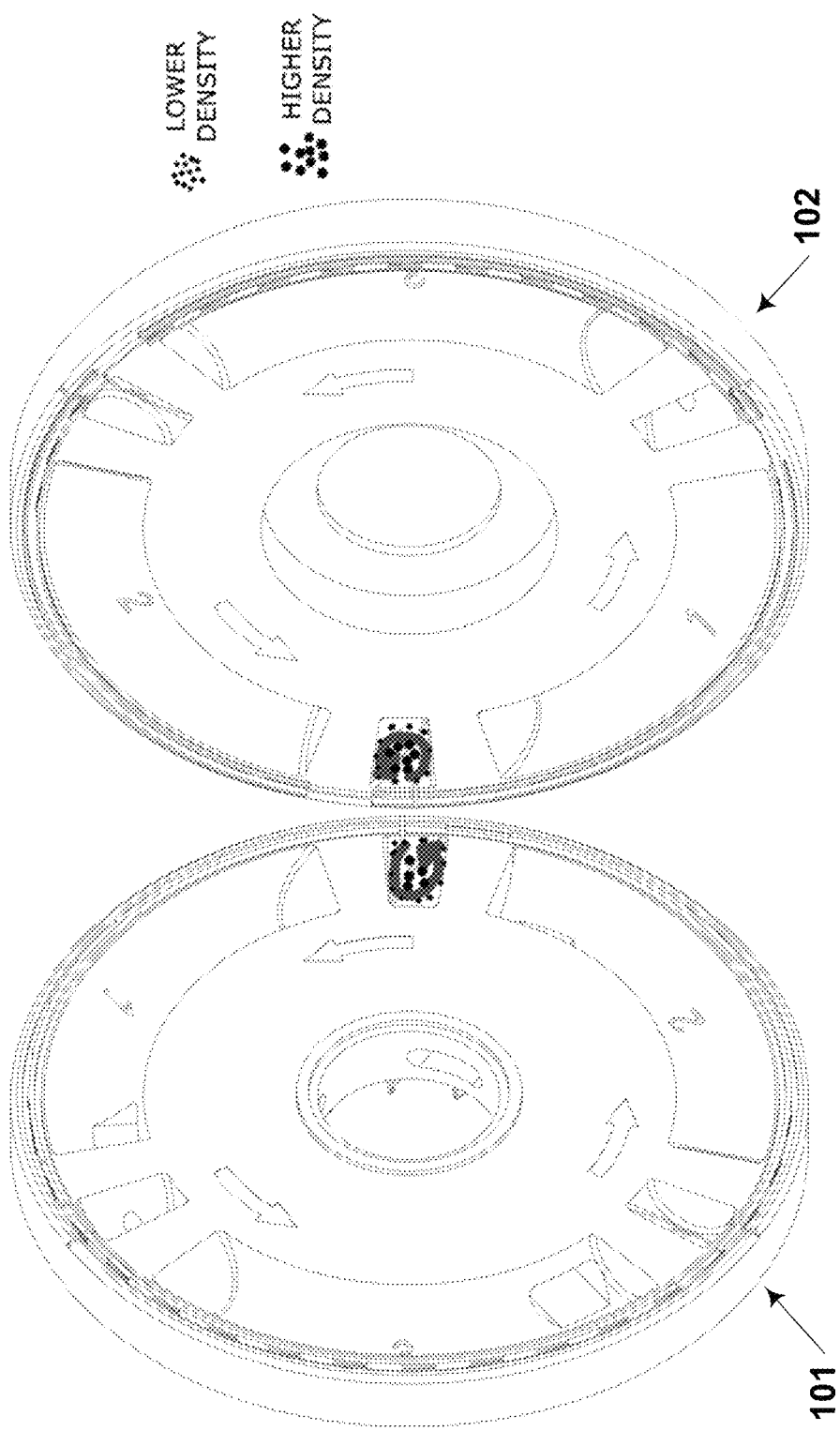
Figure 6G:
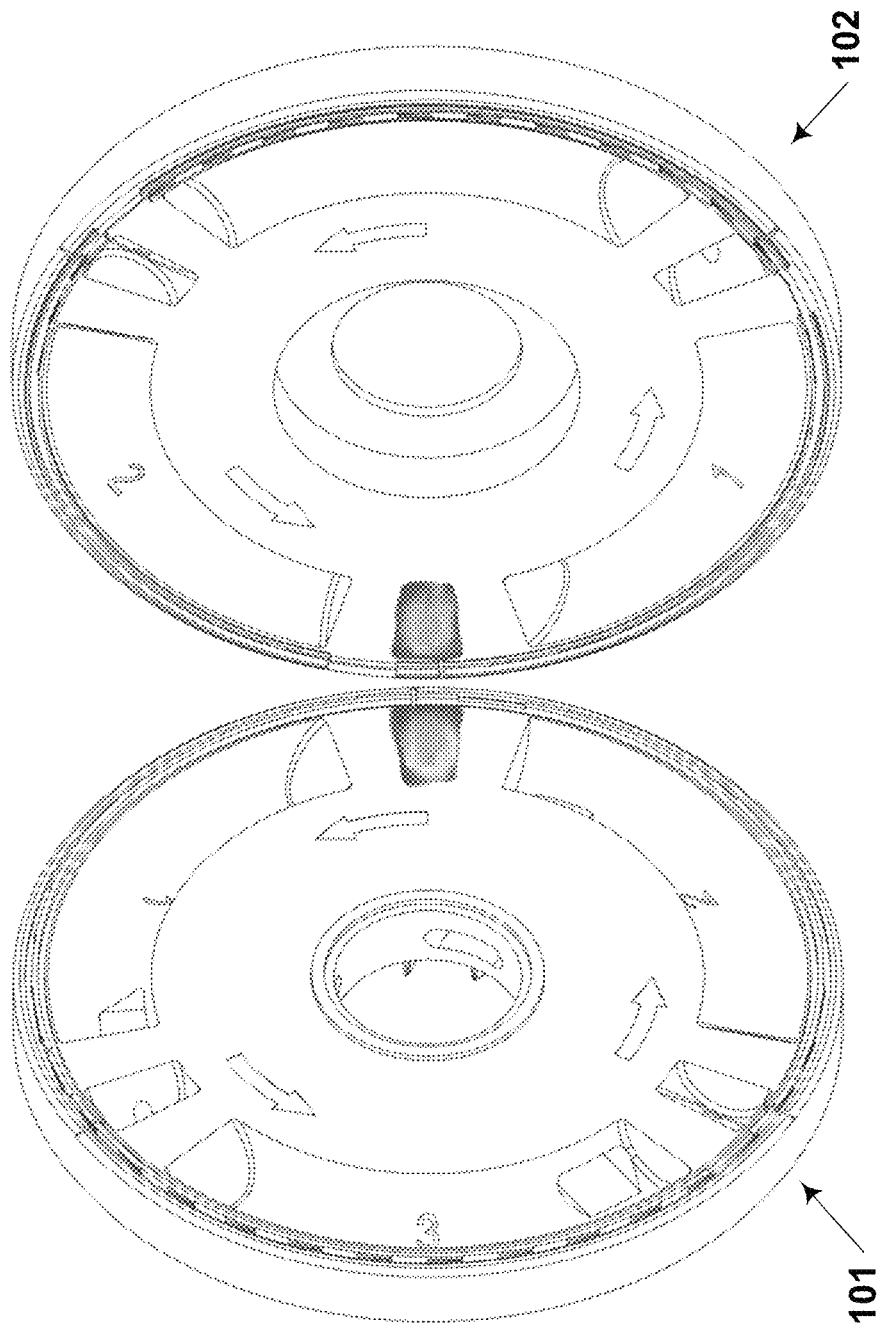
Figure 6H:
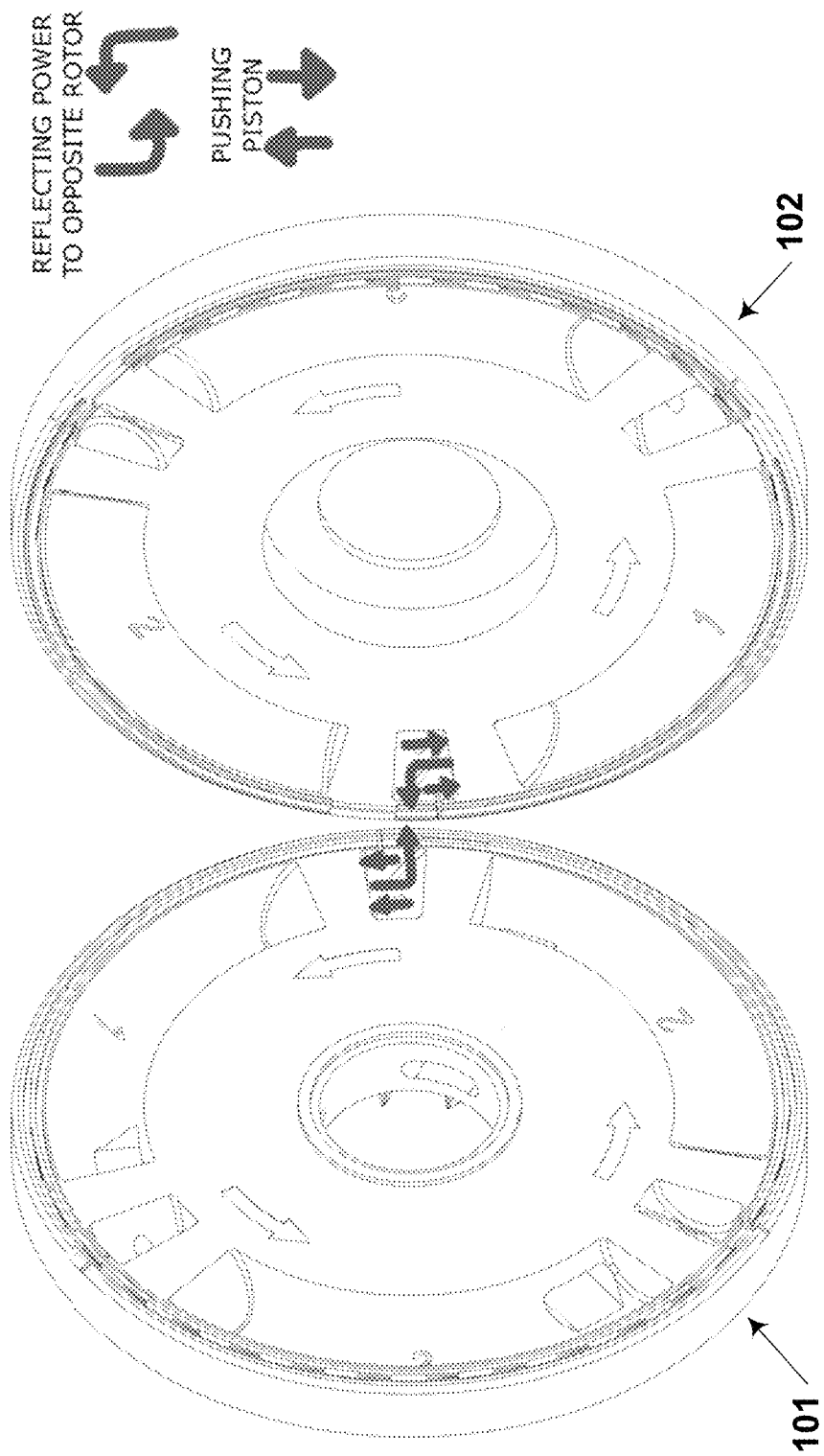
Figure 6I:
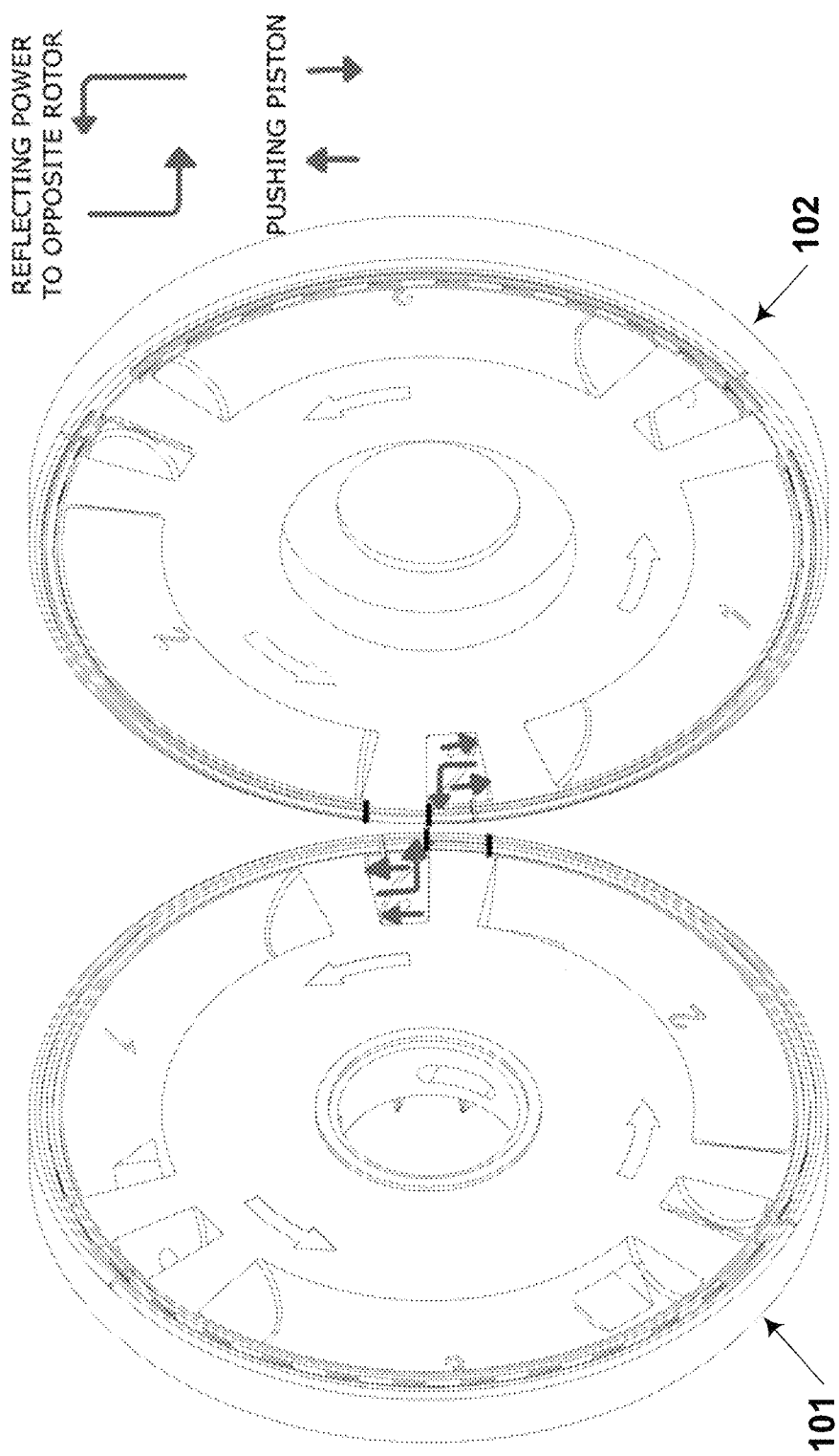
Figure 6J:
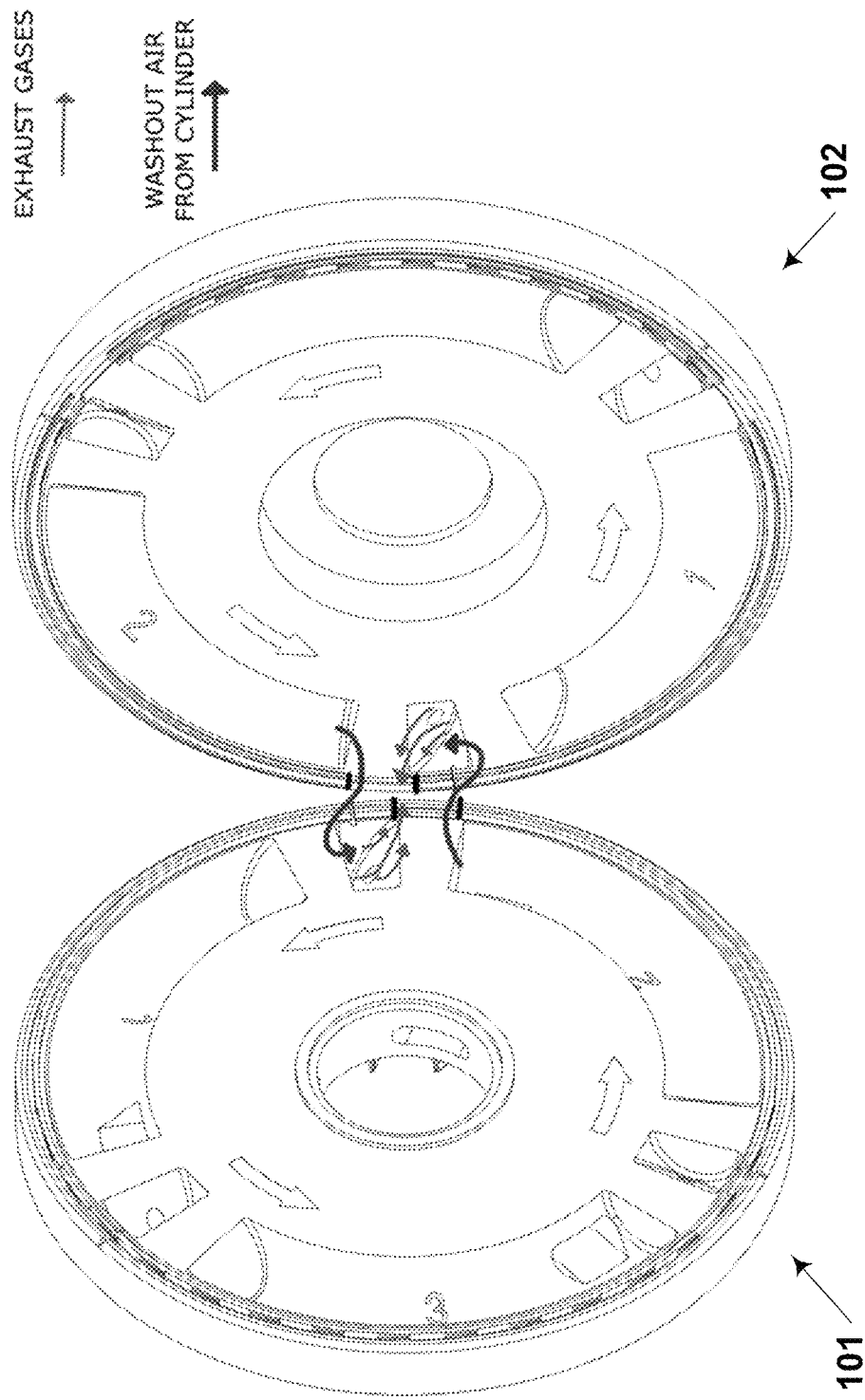
Figure 6K:
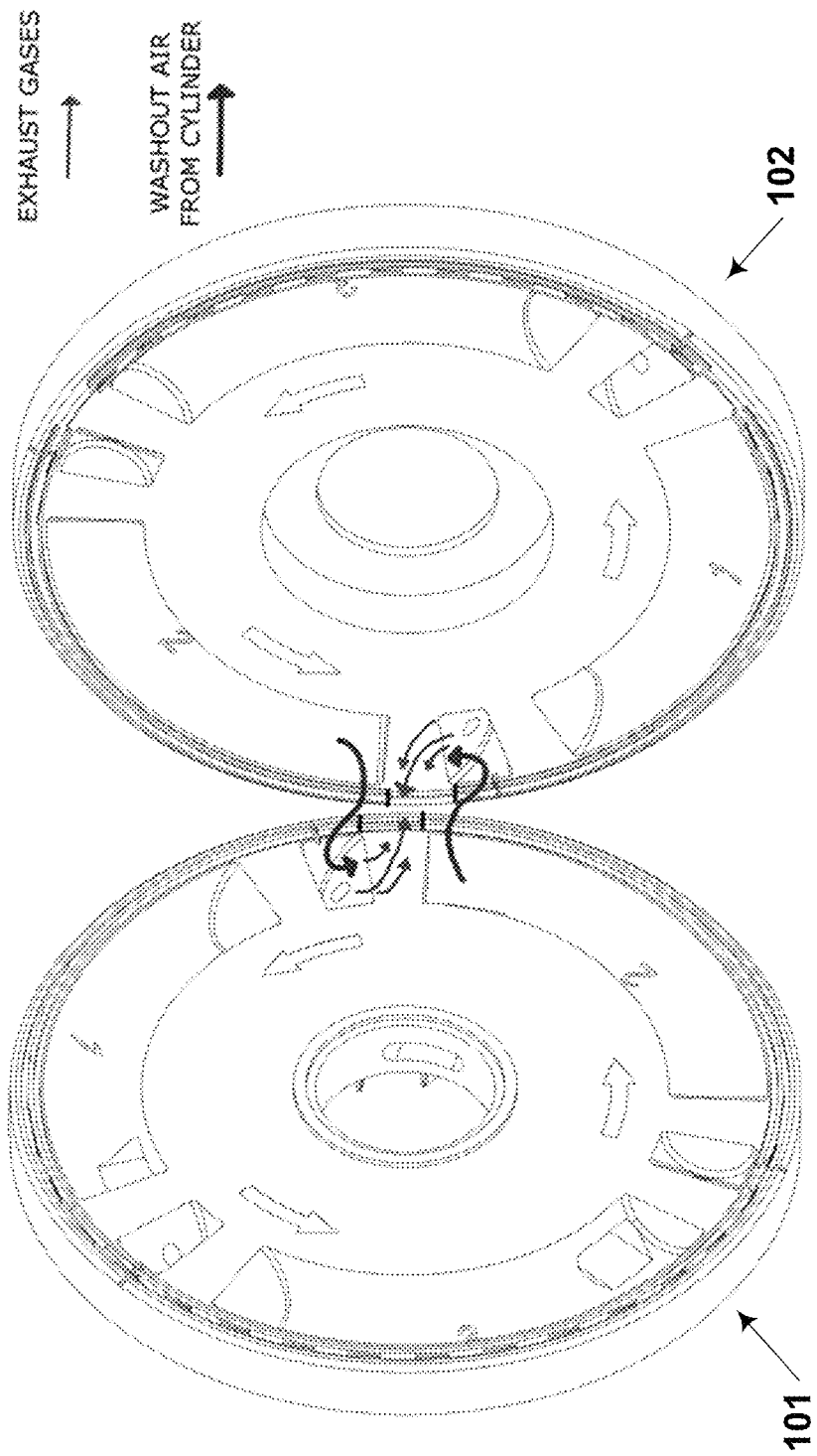

In summary, FIG. 6A shows the air plows driving and compressing the air from one side of the compression cylinder to the opposite side. The air is driven across until it reaches the air plow on the opposite side of the chamber. When the air arrives at the opposite air plow, it is immediately driven back across the compression cylinder to the original side where it then is driven into the hemi combustion chamber as shown in FIG. 6B. As the rotors continue to rotate, they next move the expansion blocks in front of the hemi combustion chambers as noted in FIG. 6C. This then locks the compressed air into each hemi combustion chamber. The hemi combustion chambers then begin to merge as shown in FIG. 6D. While they are merging, the fuel is injected through the injection port as shown in FIG. 6E. FIG. 6F demonstrates the fuel stratification into a thin outer layer and a denser inner core as the hemi combustion chambers merge into a single combustion chamber. FIG. 6G depicts rapid and total combustion after spark plug ignition on both sides of the chamber creates a rapid pressure and temperature rise that then causes instantaneous combustion of the denser inner core of the air-fuel mixture. FIG. 6H demonstrates the initial expansion of the power cycle. The straight arrows show the force that pushes the piston and the rotors. The curved arrows represent the force over the power reflectors that is reflected across to the other half of the combustion chamber and this then adds to the force on the opposite rotor. In FIG. 6H the combustion chambers have moved halfway down the expansion blocks, thus returning the combustion chamber to full expansion. One half way down the expansion blocks is 2 inches. Since the combustion chamber is four inches wide and two pistons are each moving two inches, this achieves full expansion of the combustion chamber. In FIG. 6I the hemi combustion chambers have moved to the outer edge of the expansion blocks, thus allowing the combustion chamber to expand eight inches and to reach 100% hyper expansion. In FIG. 6J the combustion chambers start to open into the compression cylinders and this burst of pressurized air helps to push the exhaust out the exhaust port in FIG. 6K. The exhaust is also driven out of the exhaust port by centrifugal force and Venturi effect.

Ignition System

The engine is started in a conventional manner. A battery powers a starter motor to "crank" the power shaft sufficiently to turn over the rotors and generate enough compression to allow the engine to fire and subsequently to continue the fuel-powered combustion cycle as described above and below. In the large embodiment, ignition is by conventional capacitor discharge; in the small embodiment, ignition is by dual magnetos.

Cooling System

The engine is air-cooled as described above. For passenger comfort, if required, the belt 6 drives a conventional cabin air conditioning system, which comprises a belt-driven compressor 9, evaporator (not shown) and other conventional piping components. Since the engine is air-cooled, heating for the passenger compartment may be provided by a small, liquid-cooled linear radiator installed in an expanded section of the exhaust pipe. Heat can be transferred to the passenger compartment by a small electric pump and distributed by a conventional heater core in the passenger compartment.

Electronic Control Module (ECM)

The engine operation is managed by the engine control module that receives real-time data from the oxygen saturation sensor, intake air pressure sensor, intake air temperature sensor and cylinder head temperature sensor. Oxygen concentration is increased to 50% from ambient air of 21% and nitrogen is decreased to 50% from ambient air of 78% by means of two cylindrical membrane oxygen concentrators. These cylinders have a combined output of 34,000 cubic feet per hour. This and other significant improvements should bring the overall efficiency of the engine to approximately 80% from the present average of the low 20% range of most current engines. The ignition is conventional capacitor discharge but is transferred to the spark plugs by rotor plugs which are spark plugs with the anode contact removed. All three cylinders fire simultaneously three times for each power shaft revolution, giving it nine power strokes per revolution and a very high power-to-weight ratio. The engine has no friction parts, aside from the bearings, and does not run in oil. All power shaft bearings and the two gear boxes are sealed and run in synthetic lubricant. Because all expansion energy is consumed in the engine, the exhaust should be very quiet and should not require a muffler. The counterrotating rotors should make the engine very stable and, if installed in the front of an automobile, the gyroscopic effect should improve the stability of the ride. Because all unburned blowby gas is spun into the "ring of fire" with good oxygen supply, there should be no unburned hydrocarbons in the exhaust and, therefore, no need for a catalytic converter or air pump. Power is delivered from the bottom end of the power shaft and may drive a torque converter, clutch or large alternator. A pulley on the output shaft drives a belt that then drives the auto accessories and the compressor turbine on the top of the engine.

Large and Small Embodiments

The embodiments disclosed above may be implemented in either of two preferred embodiments, large and small engine variations. Both engines are designed to be very efficient but the large engine has the capacity to operate systems that the small engine cannot operate. The large engine is intended for use in automobiles and large stationary power applications; the small engine is intended for use in small equipment such as chainsaws, blowers, lawnmowers, recreational vehicles, outboard motors, generators etc. The engines both utilize the same essential power functions in the rotors, compression cylinders and combustion chambers. They differ in the size of the rotors, number of combustion chambers, manner of compression of the intake air, oxygen concentration, type of ignition and engine control. They are identical in the manner of internal air compression and charging of the combustion chambers, fuel injection, spark-controlled compression ignition, exhaust and air-cooling of the rotors.

This large embodiment engine is designed to essentially replace 125-145 horsepower four and small six-cylinder engines in small to midsize automobiles. It should fit into the same engine compartment and drive the torque converter and transmission below it. While this would significantly improve present mileage, the ideal use for the engine would be to drive a large alternator at a constant speed to charge the battery in future electric cars. Eliminating all mechanical drives will also substantially increase efficiency.

The second preferred embodiment of the engine will be a simpler version for small engine applications. While this engine has the same internal operation, it eliminates the supercharger, oxygen concentrator and engine control module. The ignition system is a dual magneto. The rotor size is reduced and the number of combustion chambers is reduced to two. The power shaft accepts air from each end and feeds both rotors. A higher rpm and a narrowing of the air channels (throttle compression) to the compression cylinders keeps the compression ratio to about nine to one. Fuel injection will be of the newer single cylinder design and the air-cooling system will be essentially the same except for the air scoop and boost fan. The primary features of this engine, in addition to its higher efficiency, will be the light weight, high power-to-weight ratio, lack of vibration and quietness.

Basic Concepts

While many facts are discussed above for purposes of explaining the rotary engine in detail, the basic concepts of its design may be stated simply. The rotary engine consists of two rotors that counterrotate. Arrayed along the outer, opposing surfaces of the rotors are three compression cylinders and three combustion chambers. Air enters the compression cylinders through the power shaft and air channels in the primary rotor. It is compressed by a combination of supercharger, centrifugal force, throttle compression and ram compression. The compression cylinders are continuously filled with compressed air while the engine is running; thus, the intake and compression strokes are continuously operating while the power and exhaust strokes are repeating. Air plows in the compression cylinders drive the compressed air into the hemi combustion chambers which then combine to create three sealed combustion chambers. Fuel is injected into the combustion chambers and is ignited by two spark plugs in each combustion chamber. The air in the combustion chambers is spinning in a vortex and this allows for a type of spark-controlled compression ignition. All three cylinders are fired simultaneously. The pistons on each rotor are then driven apart in opposite rotations. The primary rotor is affixed to the power shaft and the secondary rotor is on a bearing affixed to the power shaft. The reversed power on the secondary rotor is then reversed by a gearbox that drives the power shaft in the same direction as the primary rotor. The pistons are allowed to move two times the (arc) length of the combustion chamber to capture all the power of the expanding combustion gases. The combustion gases then exhaust through a port on the margins of the rotors. Air enters the engine through the power shaft after compression by a supercharger. Some of the air is passed through membrane oxygenators that raise the oxygen level to about 50% (30% above ambient air) and lower the nitrogen concentration to about 50% (30% below ambient air). Fuel and exhaust move through ports that are opened in a virtual seal around the margins of the rotors. The airflow into the power shaft is controlled by an iris valve. The engine is air-cooled by air driven by centrifugal force over cooling fins on the outer surface of the rotors. The cooling air is then vented into the exhaust manifold where it drives stagnant exhaust gases out of the exhaust manifold. The cooling air is also channeled across the fuel injector tips to keep them cool. Both the compression cylinders and the combustion chambers are provided (for example, coated) with a material such as BAM (boron, aluminum, magnesium alloy) to reduce heat loss before the power stroke is completed. Other techniques besides coating and other materials besides BAM may be employed if they are suitable for the desired purpose.

TABLE 1

Figure 2C:
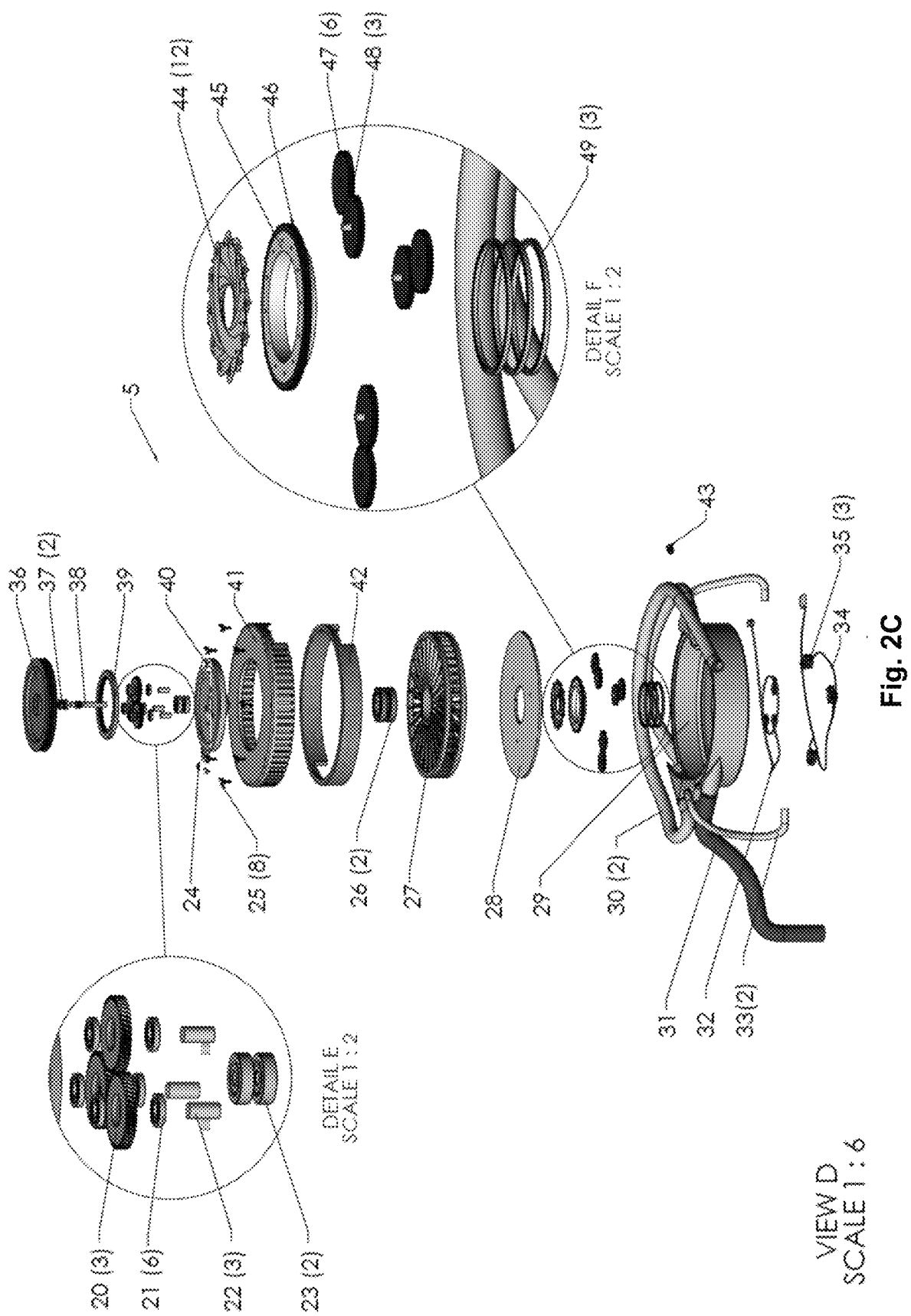
FIG. 2C is an enlarged view of a portion of FIG. 1F. See Table 1 for reference letters. Quantities are in parentheses.

References for FIG. 2C

| | |
|---|---|
| 20 | Step Up Gear (Helical Cut) |
| 21 | Step Up Gear Bearing |
| 22 | Step Up Gear Shaft |
| 23 | Lower Turbine Shaft Bearing |
| 24 | Upper Gearbox Lubricant Plug |
| 25 | Air Filter Cover Thumbscrews |
| 26 | Turbine Bearing |
| 27 | Squirrel Cage Fan & Turbine |
| 28 | Compression Chamber Bottom Plate |
| 29 | Compression Chamber Housing |
| 30 | Oxygenator Output Hoses From Oxygenator |
| 31 | Compressed Air Output to Intercooler |
| 32 | Sensors & Wires (Oxygen, Pressure, Temp.) |
| 33 | Air Pressure Bleed Hose From Manifold |
| 34 | Iris Valve Motor Wiring |
| 35 | Iris Valve Motor |
| 36 | Turbine Shaft Pulley |
| 37 | Upper Turbine Shaft Bearing |
| 38 | Turbine Shaft |
| 39 | Upper Gearbox Outer Gear |
| 40 | Upper Gearbox Housing |
| 41 | Air Filter Cover |
| 42 | Air Filter |
| 43 | Pressure Relief Valve |
| 44 | Iris Valve Leaf |
| 45 | Iris Valve Socket |
| 46 | Iris Valve Ring Gear (Straight Cut) |
| 47 | Small Iris Gear (Straight Cut) |
| 48 | Iris Gear Shaft |
| 49 | Iris Valve Seal & Bearing |

TABLE 2

References for FIG. 4A

| | |
|---|---|
| 6 | Fan Belt |
| 7 | Alternator |
| 8 | Power Steering Pump |
| 9 | A/C Compressor |
| 10 | Idler Pulley With Tensioner |
| 11 | Air Scoop |
| 12 | Cooling Fan |
| 13 | Intercooler & Mounts |
| 14 | Exhaust Manifold |
| 15 | Fuel Rail |
| 50 | Cooling Fan Wiring |
| 51 | Cooling Air Duct Upper (Primary Rotor) |
| 52 | Accessory Bracket |
| 53 | Engine Mount |
| 54 | Fuel Injector |
| 55 | Gearbox Housing |
| 56 | Idler Gear (Spiral Bevel) |
| 57 | Power Shaft Gear (Spiral Bevel) |
| 58 | Fan Belt Pulley |
| 59 | Driven Starter Gear (Miter) |
| 60 | Splash Shield |
| 61 | Rotor Plug Insert |
| 62 | Power Shaft Position Sensor |
| 63 | Rotor Plug |
| 64 | Shielded Rotor Plug Wiring |
| 65 | Rotor Gearbox Lubricant Plug |
| 66 | Starter |
| 67 | Starter Mount |
| 68 | Starter Drive Gear (Miter) |
| 69 | Fuel Rail Mount |
| 70 | Secondary Rotor Gear (Spiral Bevel) |
| 71 | Idler Gear Shaft |
| 72 | Idler Gear Bearing |
| 73 | Exhaust Pipe Mount |
| 74 | Fuel Line |
| 75 | Fuel Injector Wiring |
| 76 | Air Pressure Bleed Hose to Compression Chamber |
| 77 | Bottom Outer Plate |
| 84 | Cooling Air Duct Lower (Secondary Rotor) |
| 86 | Power Shaft Sealed Bearing & Seal |
| 111 | Gearbox Spider |
| 112 | Lower Power Shaft Bearing |

TABLE 3

References for FIG. 4B

| | |
|---|---|
| 3 | Power Shaft |
| 4 | Oxygenator |
| 16 | Spark Plug |
| 30 | Oxygenator Output Hoses to Compression Chamber |
| 61 | Rotor Plug Insert |
| 63 | Rotor Plug |
| 64 | Shielded Rotor Plug Wiring |
| 78 | Intercooler Output Hose From Intercooler |
| 79 | Compression Chamber Mount |
| 80 | Top Plate |
| 81 | Contact Tip |
| 82 | Nitrogen Hose |
| 83 | Ground Wire |
| 85 | Oxygenator Mount |
| 87 | Infrared Temp Sensor |
| 101 | Primary Rotor |
| 102 | Secondary Rotor |
| 107 | Secondary Rotor Bearing |
| 109 | Upper Power Shaft Bearing |

TABLE 4

References for FIGS. 5A-5B

| | |
|---|---|
| 16 | Spark Plug |
| 90 | Air Plow |
| 91 | Piston |
| 92 | Power Reflector |
| 93 | Expansion Block |
| 94 | Exhaust Port |
| 95 | Injector Port |
| 96 | Combustion Chamber |
| 97 | Compression Cylinder |
| 105 | Compressed Air Intake Port |
| 120 | Virtual Seal |

The invention claimed is:

1. An internal combustion rotary engine, comprising:
a non-rotating outer housing;
a pair of counterrotating rotors within the non-rotating outer housing;
a power shaft, having an axis, to which each of the rotors is coupled, one rotor coupled directly and the other rotor coupled through a reversing gear arrangement;
in which each rotor has a structured inner surface perpendicular to the power shaft axis, and each inner surface counterrotates past the other; and
in which compressed air and fuel from external to the outer housing are:
introduced into the outer housing and then into chambers formed by the structured inner surfaces of the rotors;
mixed and ignited to expand in volume, causing the rotors to move and the power shaft to rotate about the axis; and
exhausted from between the inner surfaces and then from within the outer housing.

2. The engine of claim 1, further comprising a set of circumferential tongues and grooves that lie around the outermost extent of the perimeters of each of the rotors, and interlace with each other when the rotors are assembled with their respective inner surfaces facing each other, and provide controlled flow of gases into or from between the rotors.

3. The engine of claim 2, in which each of the circumferential tongues and grooves defines at least one gap in itself, which gaps overlap with each other to define at least one port for the controlled flow of gases.

4. The engine of claim 3, in which at least one port that provides the controlled flow of gases comprises at least one straight passage, and at least one concave reflector surface defined at an end of a straight passage.

5. The engine of claim 3, in which at least one port that provides the controlled flow of gases comprises at least one straight passage.

6. The engine of claim 3, in which at least one port that provides the controlled flow of gases comprises at least one turbulence block.

7. The engine of claim 1, in which each of the inner surfaces of the rotors is not in frictional contact with the other.

8. The engine of claim 1, in which each of the inner surfaces of the rotors comprises a hard, heat-resistant and low-friction material having a coefficient of friction less than 0.16.

9. The engine of claim 1, in which the engine is characterized by nine power strokes per revolution.

10. The engine of claim 1, in which the engine is characterized by four cycles, including an air compression cycle and a power generation cycle; and, further in which the air compression cycle and the power generation cycle are distinct cycles from each other.

11. The engine of claim 1, in which the engine is characterized by intake and compression of air occurring continuously while the engine is running.

12. The engine of claim 1, in which at least one of the rotors further comprises cooling fins such that the engine is cooled by centrifugal air flow within the outer housing and over the cooling fins.

13. The engine of claim 1, in which the engine defines at least one exhaust port and the engine exhaust gases flow out of the at least one exhaust port by at least one of centrifugal force, Venturi effect and air pressure.

14. The engine of claim 1, further comprising a supercharger, an intercooler and at least one oxygen concentrator, in which compressed air from the supercharger is cooled by the intercooler before feeding at least one oxygen concentrator.

15. The engine of claim 1, in which the power shaft is hollow such that air enters the engine through the power shaft, and further comprising an iris valve mounted to control the flow of air into the power shaft.

16. The engine of claim 15, in which the iris valve is controlled by at least one clock motor having a gear reduction.

17. The engine of claim 15, further comprising at least one sensor to monitor air flow into the power shaft for at least one of oxygen level, temperature, and pressure.

18. The engine of claim 15, further comprising an engine control module which controls the iris valve to regulate air flow into the engine in response to at least one of oxygen level, pressure and temperature.

19. The engine of claim 1, in which the power shaft further comprises tapered fins which spin air entering the engine at a same rate of revolution as the rotors counterrotate.

20. The engine of claim 1, in which the rotors are driven by hyper-expansion of combustion gases in a repeating combustion cycle.

21. The engine of claim 1, in which the engine is characterized by consumption of engine combustion gases and further by hyper-expansion of the engine combustion gases to capture all the energy due to expansion of the engine combustion gases.

22. The engine of claim 1, in which the engine is characterized by recesses formed in inner surfaces of each of the rotors, which recesses define a plurality of compression cylinders and a plurality of combustion chambers.

23. The engine of claim 22, in which each combustion chamber is shaped to define two hemi combustion chambers.

24. The engine of claim 22, in which the combustion chambers are arranged on the rotors such that they are continuously reconstructed from two counterrotating hemi combustion chambers.

25. The engine of claim 22, in which at least one of the compression cylinders and combustion chambers is coated with an alloy comprising boron, aluminum and magnesium.

26. The engine of claim 22, in which at least two of the combustion chambers fire simultaneously.

27. The engine of claim 22, in which each of the combustion chambers comprises expansion blocks, such that hyper expansion of combustion gases occurs along the expansion blocks, over a distance approximately equal to two times a width of one of the combustion chambers, to consume all the pressure of the expansion of the combustion gases.

28. The engine of claim 22, in which all of the combustion chambers fire simultaneously.

29. The engine of claim 22, in which each of the combustion chambers are adapted to have two spark plugs, one spark plug mounted in each of the rotors.

30. A system for use of one of compressed air and combustible fuel, the system comprising: an internal combustion rotary engine which comprises a non-rotating outer housing, a pair of counterrotating rotors within the non-rotating outer housing, and a power shaft, having an axis, to which each of the rotors is coupled, one rotor coupled directly and the other rotor coupled through a reversing gear arrangement; in which each rotor has a structured inner surface perpendicular to the power shaft axis, and each inner surface counterrotates past the other; in which the engine mixes and ignites the compressed air and the fuel within chambers formed by structured inner surfaces of the rotors, causing the rotors to move and the power shaft to rotate about the axis.

31. A method of internally combusting gases within a rotary engine, comprising:
   a) providing an internal combustion rotary engine which comprises a non-rotating outer housing, a pair of counterrotating rotors within the non-rotating outer housing, and a power shaft, having an axis, to which each of the rotors is coupled, one rotor coupled directly and the other rotor coupled through a reversing gear arrangement; in which each rotor has a structured inner surface perpendicular to the power shaft axis, and each inner surface counterrotates past the other;
   b) introducing compressed air and fuel into the outer housing of the engine;
   c) mixing the compressed air and the fuel together; and
   d) igniting the mixed compressed air and the fuel within chambers formed by structured inner surfaces of the rotors, causing the rotors to move and the power shaft to rotate about the axis.

32. The method of claim 31, further comprising at least one of reducing nitrogen concentration and increasing oxygen concentration in engine intake gases consumed by the engine.

33. The method of claim 31, in which the engine operates in nine power strokes per revolution of the power shaft.

34. The method of claim 31, in which the engine operates in four cycles, including an air compression cycle and a power generation cycle; and, further, in which the air compression cycle and the power generation cycle are distinct cycles from each other.

35. The method of claim 31, in which the engine operates by taking in and compressing air continuously while the engine is running.

36. The method of claim 31, in which at least one of the rotors further comprises a cooling fin, and the engine is characterized by centrifugal air flow within the outer housing and over the cooling fin.

37. The method of claim 31, further comprising at least one of: monitoring air flow within the engine for at least one of oxygen level, temperature, and pressure; and regulating air flow into the engine in response to at least one of oxygen level, pressure and temperature.

38. The method of claim 31, in which igniting occurs in at least two of the chambers simultaneously.

\* \* \* \* \*